US012454899B1

United States Patent
Khan et al.

(10) Patent No.: US 12,454,899 B1
(45) Date of Patent: *Oct. 28, 2025

(54) FUEL INJECTED INDEPENDENT ROTARY VALVE ENGINE

(71) Applicant: KING FAHD UNIVERSITY OF PETROLEUM AND MINERALS, Dhahran (SA)

(72) Inventors: Sikandar Khan, Dhahran (SA); Fayyaz, Dhahran (SA); Hassan Javed, Angelholm (SE); Muhammad Waqas, Mianwali (PK); Agha Muhammad Jazim, Karachi (PK)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/248,571

(22) Filed: Jun. 25, 2025

Related U.S. Application Data

(63) Continuation of application No. 19/183,677, filed on Apr. 18, 2025, now Pat. No. 12,366,183.

(Continued)

(51) Int. Cl.
  *F01L 7/02* (2006.01)
  *F01L 1/02* (2006.01)
  *F01L 1/34* (2006.01)

(52) U.S. Cl.
  CPC .............. *F01L 7/026* (2013.01); *F01L 1/024* (2013.01); *F01L 1/34* (2013.01)

(58) Field of Classification Search
  CPC .............. F01L 7/026; F01L 1/024; F01L 1/34
  See application file for complete search history.

(56) References Cited

U.S. PATENT DOCUMENTS

| 4,016,840 A | 4/1977 | Lockshaw |
| 5,448,971 A | 9/1995 | Blundell et al. |

(Continued)

FOREIGN PATENT DOCUMENTS

DE    44 47 688 C2    3/2000

OTHER PUBLICATIONS

Chains and Sprockets, Rainbow Precision Products, www.rainbowprecisionproducts.com/chains-sprockets-bushings, 6 pages.

*Primary Examiner* — Lindsay M Low
*Assistant Examiner* — Charles J Brauch
(74) *Attorney, Agent, or Firm* — Oblon, McClelland, Maier & Neustadt, L.L.P.

(57) ABSTRACT

A independent rotary valve engine and a method for controlling thereof includes an engine crankcase, a crankshaft located therein, a bidirectional servo motor connected to the engine crankcase, a cylinder block connected to the engine crankcase, and a cylinder head connected to the cylinder block, with a spark plug and a piston linked by a connecting rod to the crankshaft. An intake rotary valve is located within a first channel in the cylinder head, and an exhaust rotary valve is located within a parallel second channel. A pulley connects a servo motor shaft of the bidirectional servo motor to the intake rotary valve. An engine control device, operatively connected to the spark plug and the bidirectional servo motor, generates spark timing signals, receives an engine speed requirement, determines a wide-open throttle position and intake valve closing angle, and generates variable valve timing signals to rotate the servo motor shaft.

14 Claims, 13 Drawing Sheets

Related U.S. Application Data

(60) Provisional application No. 63/640,474, filed on Apr. 30, 2024.

(56) References Cited

U.S. PATENT DOCUMENTS

| | | | |
|---|---|---|---|
| 5,690,069 A | 11/1997 | Huwarts | |
| 2016/0230617 A1* | 8/2016 | Tolbert | F01L 7/023 |

* cited by examiner

FUEL INJECTED INDEPENDENT ROTARY VALVE ENGINE

CROSS REFERENCE TO RELATED APPLICATIONS

The present application is a Continuation of U.S. application Ser. No. 19/183,677, now allowed, having a filing date of Apr. 18, 2025, which claims benefit of priority of U.S. Provisional Application No. 63/640,474 having a filing date of Apr. 30, 2024 and which is incorporated here by reference in its entirety.

BACKGROUND

Technical Field

The present disclosure is directed to internal combustion engines, and more specifically to internal combustion engines utilizing rotary valve systems for controlling intake and exhaust gas flow.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Internal combustion engines are widely used power sources, particularly in automotive applications. Conventional engines typically employ poppet valves, actuated by a camshaft mechanism including springs, lifters, and rockers, to control the flow of an air-fuel mixture into cylinders and the expulsion of exhaust gases therefrom. While functional, these poppet valve systems inherently introduce certain inefficiencies and limitations. A significant portion of mechanical energy can be lost due to friction within the complex valve train components and the energy required to overcome spring forces. Furthermore, the mass and inertia of the valve train components can limit the maximum operational speed of the engine.

A primary method for controlling power output in conventional spark-ignition engines involves throttling the intake air flow using a throttle plate located upstream in the intake manifold. While effective for power modulation, this throttling action creates a significant pressure drop between the atmosphere and the cylinder during the intake stroke, particularly at part-load conditions. The engine must expend energy to draw the air-fuel mixture past this restriction, resulting in pumping losses that substantially reduce overall thermal efficiency. This loss is particularly pronounced during typical driving conditions where the engine operates frequently at part load rather than at wide-open throttle.

Efforts to mitigate these drawbacks have led to the development of various technologies, such as variable valve timing (VVT) and variable valve lift (VVL) systems. These systems aim to optimize valve opening and closing events based on engine speed and load, potentially improving volumetric efficiency and reducing pumping losses to some extent. However, many VVT and VVL systems add significant mechanical, hydraulic, or electromechanical complexity and cost to the engine. Moreover, their range of operation or speed of adjustment may be limited, preventing full optimization across all operating conditions. Some systems, for example, for electro-hydraulic valve actuation, can be complex and expensive.

Rotary valves have been considered an alternative to poppet valves, offering potential advantages such as simpler construction, potentially reduced friction, and unobstructed port flow paths which could lead to higher volumetric efficiency and higher compression ratio capabilities. Early research indicated benefits including reduced mechanical losses and lower mass compared to poppet valve systems. However, historical implementations of rotary valves often faced significant challenges, particularly in achieving durable and effective sealing against high combustion pressures and temperatures over operating life of the engine.

DE4447688C2 describes an internal combustion engine having a combustion chamber with a cylinder head having two combustion chamber openings, wherein one forms an inlet opening and the other forms an outlet opening. In the cylinder head, two bores are provided, in each of which a hollow shaft is rotatably received. The crankshaft and the hollow shafts are coupled to each other via a chain drive. However, this system does not provide independent control of valve timing and throttle position through a servo motor and an engine control unit for optimizing engine performance across various operating conditions.

U.S. Pat. No. 5,690,069A describes a multi-cylinder internal combustion engine comprising a cylinder assembly with intake ports and exhaust ports arranged in register, wherein the distribution system for opening and closing said intake and exhaust ports include two rotary pipes each consisting of a plurality of mutually communicating aligned hollow valves. Each rotary pipe has an opening which allows air or exhaust respectively into or out of the cylinder assembly, with the rotary pipes turned by a pulley. However, this system does not provide independent control of valve timing and throttle position through a servo motor and an engine control unit for optimizing engine performance across various operating conditions.

Each of the aforementioned references suffers from one or more drawbacks hindering their adoption, such as limited adaptability to varying engine speeds, separate systems for throttling and valve timing control which increase weight and complexity, and inadequate solutions for reducing pumping losses across all operating conditions. Achieving dynamic adjustments, especially independent control of the intake valve closing point separate from crankshaft-synchronized events, can involve mechanical complexities or compromises in operational range within those described systems. These factors can affect the ability to optimize engine performance and efficiency across diverse operating conditions.

Accordingly, it is one object of the present disclosure to provide an independent rotary valve engine configuration, and associated methods, which facilitate dynamic control over intake valve operational parameters. This includes providing mechanisms for adjusting intake valve timing independently in response to determined engine operating requirements, thereby offering potential pathways to address performance optimization across different engine speeds and loads while utilizing a rotary valve architecture.

SUMMARY

In an exemplary embodiment, an independent rotary valve engine is described, comprising: an engine crankcase; a crankshaft located in a bore in the engine crankcase; a bidirectional servo motor connected to the engine crankcase;

a cylinder block connected to the engine crankcase; a cylinder head connected to the cylinder block; a piston located within a combustion chamber of the cylinder block; a connecting rod attached between the piston and the crankshaft; an intake rotary valve located within a first channel in the cylinder head; an exhaust rotary valve located within a second channel in the cylinder head, wherein the second channel is parallel to the first channel; a pulley connected to a servo motor shaft of the bidirectional servo motor and a first end of the intake rotary valve; a spark plug operatively connected within the cylinder head; and an engine control unit operatively connected to the spark plug and the servo motor, wherein the engine control unit is configured to: generate spark timing signals configured to actuate the spark plug to combust a fuel mixture in the combustion chamber, receive an engine speed requirement, determine a wide-open throttle position and an intake valve closing angle based on the engine speed requirement, and generate variable valve timing signals configured to rotate the servo motor shaft in one of a clockwise direction and a counterclockwise direction based on the wide-open throttle position and the intake valve closing angle.

In another exemplary embodiment, a method for controlling an independent rotary valve engine is described, comprising: installing an intake rotary valve into a first channel of a cylinder head; installing an exhaust rotary valve into a second channel in the cylinder head, wherein the second channel is parallel to the first channel; connecting a bidirectional servo motor on an engine crankcase; connecting a pulley to a servo motor shaft of the bidirectional servo motor and a first end of an inner shaft of the intake rotary valve; connecting, by a sprocket and chain mechanism, a crankshaft located in a bore in the engine crankcase to an outer sleeve of the intake rotary valve and to the exhaust valve; connecting, by a connecting rod, a piston located within a combustion chamber of a cylinder block to the crankshaft; generating, by an engine control unit operatively connected to the spark plug and the servo motor, spark timing signals; combusting, with a spark plug located within the cylinder head and operatively connected to the combustion chamber, a fuel mixture in the combustion chamber, receiving, by the engine control unit, an engine speed requirement; determining, by the engine control unit, a wide-open throttle position and an intake valve closing angle based on the engine speed requirement, and generating, by the engine control unit, variable valve timing signals; receiving, by the servo motor, the variable valve timing signals; and rotating, by the servo motor, the servo motor shaft in one of a clockwise direction and a counterclockwise direction based on the variable valve timing signals.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
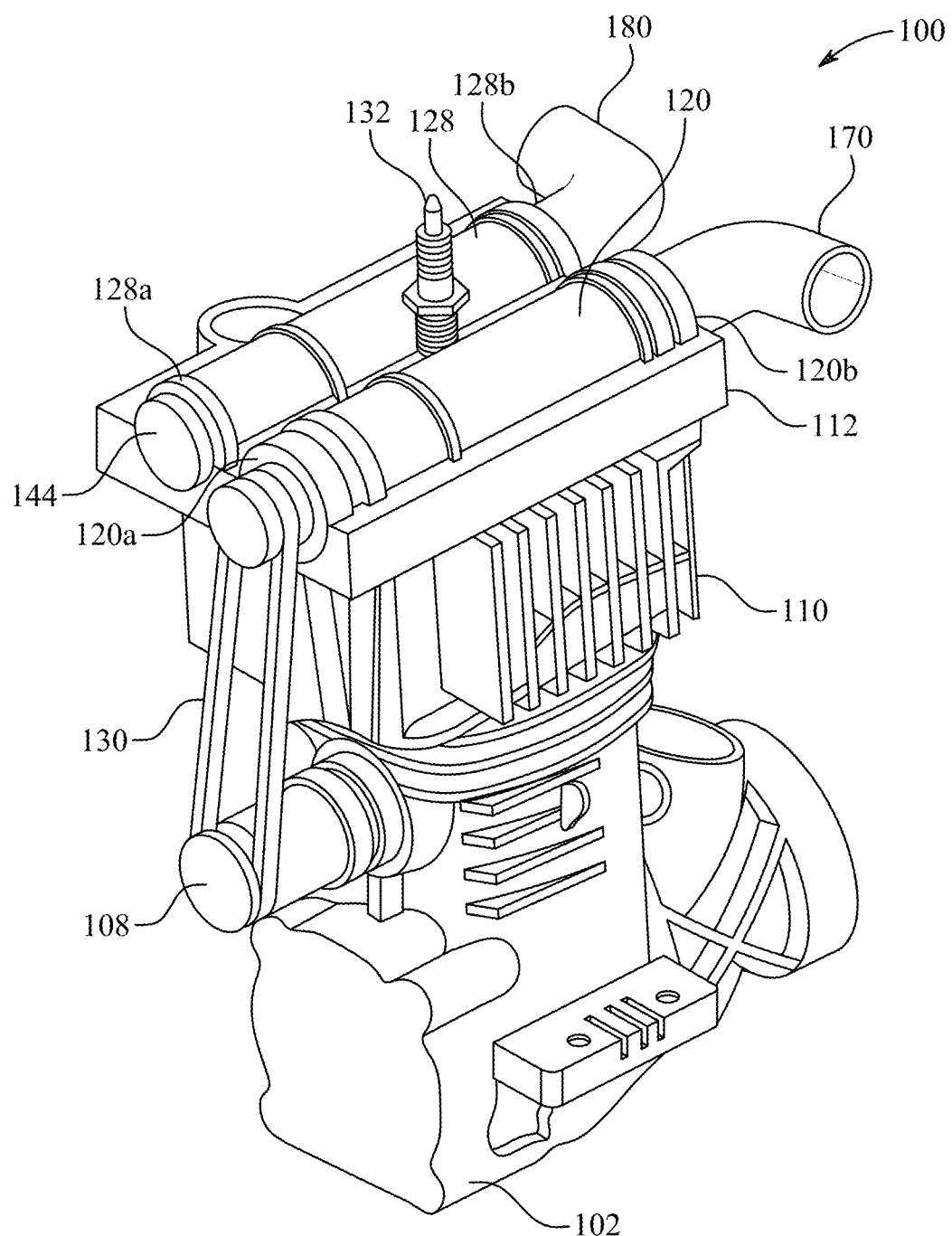
FIG. 1 is an exemplary perspective diagram of an independent rotary valve engine, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to an independent rotary valve engine and a method for controlling the independent rotary valve engine. The systems and methods of the present disclosure provide operational improvements relative to conventional internal combustion engines by utilizing a specific rotary valve configuration. This configuration features a concentric intake rotary valve assembly with independently controlled elements to manage gas exchange processes. Such a configuration facilitates enhanced operational efficiency, particularly through the reduction of pumping losses associated with traditional throttling methods and provides for highly flexible control over valve timing events across the operating spectrum of the independent rotary valve engine, replacing conventional poppet valve trains and their associated complexities.

Figure 2:
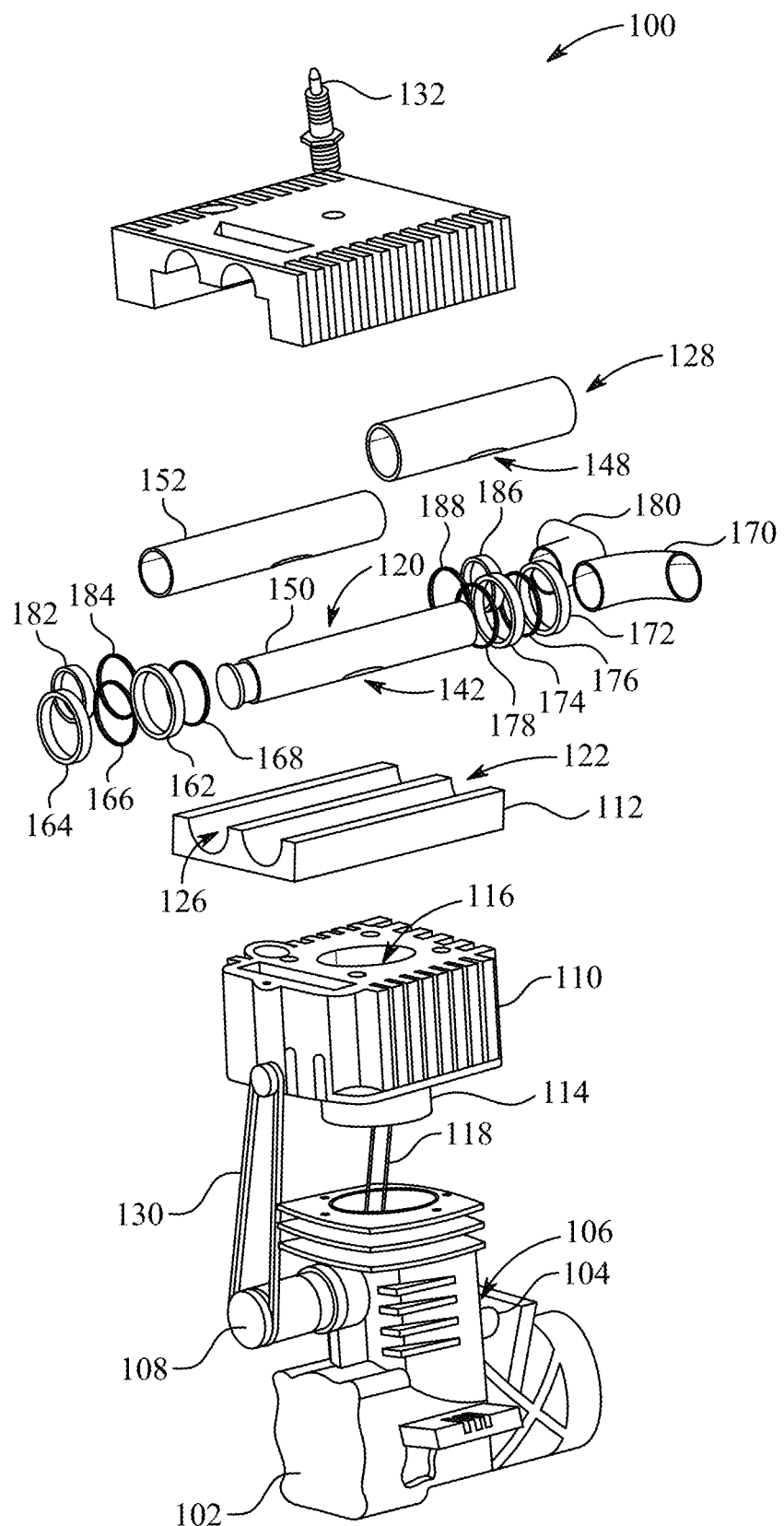
FIG. 2 is an exemplary exploded diagram of the independent rotary valve engine, according to certain embodiments.

Referring to FIGS. 1 and 2, illustrated are diagrams of an independent rotary valve engine (as represented by reference numeral 100). The independent rotary valve engine 100 of the present disclosure is a multi-component system integrating mechanical, electromechanical, and electronic control technologies, developed in the context of improving internal combustion engine performance and efficiency. Conventional engines often experience efficiency limitations related to valve train complexity and throttling losses. The independent rotary valve engine 100 provides a configuration replacing conventional poppet valves and camshaft actuation systems with controlled rotary valve mechanisms housed within a cylinder head 112. This approach modifies the gas exchange process by providing direct control over intake mixture flow at the cylinder port itself, which may mitigate pumping losses associated with upstream throttling methods. The configuration is designed to facilitate variable valve actuation (VVA), including independent control of intake valve closing (IVC) timing, synchronized with the standard four-stroke engine cycle managed through a combination of crankshaft-driven and servo-motor-driven components under the supervision of an engine control device. The independent rotary valve engine 100 has potential applications spanning various fields requiring internal combustion power sources, including automotive, power generation, and potentially other transportation sectors where efficiency improvements are sought.

As illustrated, the independent rotary valve engine 100 includes an engine crankcase 102. The engine crankcase 102 constitutes a structural component, typically forming a lower portion of the assembly of the independent rotary valve engine 100. The engine crankcase 102 provides a rigid foundation and enclosure for internal rotating components. The engine crankcase 102 is designed with internal structures and surfaces configured to support components therein. Furthermore, the engine crankcase 102 serves as a reservoir for lubricating oil, utilized for minimizing friction and wear between moving parts during operation of the independent rotary valve engine 100. The engine crankcase 102 provides machined mounting surfaces for the attachment of other primary engine components. The material composition and structural design of the engine crankcase 102 are selected to withstand the mechanical stresses, vibrations, and thermal loads encountered during the operation of the independent rotary valve engine 100, supporting long-term durability and reliable performance.

The independent rotary valve engine 100 further includes a crankshaft 104 located in a bore 106 in the engine crankcase 102. As depicted generally in FIG. 2, the crankshaft 104 is a rotating component housed within the engine crankcase 102, specifically supported within the bore 106. The bore 106 provides rotational support, typically incorporating main bearings (not explicitly labelled) to facilitate low-friction rotation of the crankshaft 104. A function of the crankshaft 104 within the independent rotary valve engine 100 involves the conversion of generated reciprocating motion into rotational motion, which constitutes the usable power output of the independent rotary valve engine 100.

The crankshaft 104 incudes one or more crankpins (not shown) offset from the main rotational axis, which serve as attachment points for components transmitting force from the combustion process.

The crankshaft 104 is made from high-strength materials, such as steel, titanium, tungsten and nickel-chromium based alloys. The nickel-chromium based alloys may include iron and any one of cobalt, manganese, copper, niobium and tantalum having tensile strengths which range from 550 MPa to 1100 MPa.

In a non-limiting example, the crankshaft 104 may be made from forged steel. Forged steel is a material created by shaping steel through compressive forces while it's heated, resulting in a denser, stronger, and more durable product compared to cast steel, making it ideal for high-stress applications. In a non-limiting example, the forged steel may be any of forged steels AISI 1010, AISI 1045 and AISI 1053, which have a tensile strength in a range of 100,000 to 110,000 psi which renders the crankshaft capable of withstanding the torsional and bending stresses generated during the combustion cycle and power transmission. In another non-limiting example, the forged steel may be either one of forged steels having nomenclature assigned by the American Iron and Steel Institute (AISI) 4140 and AISI 4340, which are alloy steels which contain chromium, manganese and carbon. Forged steel AISI 4340, a nickel-chrome-molybdenum alloy, contains more nickel and molybdenum than forged steel AISI 4140, providing higher strength, toughness, and flexibility. On the other hand, forged steel AISI 4140 contains a higher percentage of chromium, which gives it more excellent hardness and wear resistance. In another non-limiting example, the crankshaft 104 may be made from titanium, which has a tensile strength of about 1172 MPa with a low density of about 4.51 $g/cm^3$, which results in a high strength-to-weight ratio, making it suitable for applications requiring weight reduction.

The geometry of the crankshaft 104, including the number and arrangement of crankpins and counterweights, is determined by the specific configuration of the independent rotary valve engine 100. Furthermore, the crankshaft 104 serves as a timing reference for the engine cycle and provides the driving force for certain other engine components via mechanical linkages.

The independent rotary valve engine 100 further includes a bidirectional servo motor 108 connected to the engine crankcase 102. The bidirectional servo motor 108, depicted generally in relation to other components in FIGS. 1 and 2, is an electromechanical actuator integrated into the engine assembly. The bidirectional servo motor 108 is physically mounted or connected to the engine crankcase 102, providing a stable base for its operation. The bidirectional servo motor 108 is operatively linked to part of a valve system and is configured to dynamically adjust the rotational position of the intake rotary valve, thereby participating in the control of gas flow into a combustion chamber (as described below). The bidirectional servo motor 108 is configured for controlled rotational movement in both clockwise and counterclockwise directions upon receiving command signals. This bidirectional capability serves its function within the independent rotary valve engine 100, defining the required rotational position or movement based on various engine operating parameters.

The Independent Rotary Valve (IRV) engine of the present disclosure manages the intake process using the two concentric rotary valves, which include an outer sleeve portion 152 mechanically linked to the engine crankshaft 104 for synchronization with the piston cycle, and an inner valve portion 150 of the intake rotary valve 120 that is electronically controlled via the bidirectional servo motor 108. The bidirectional servo motor 108 is used to dynamically adjust the intake valve closing (IVC) angle. By rotating the inner valve portion 150 relative to the outer sleeve portion 152, the motor directly influences the timing and duration of the intake event. This arrangement allows for precise, real-time modulation of the IVC angle based on engine speed and load, thereby enhancing engine performance across the full RPM range.

The bidirectional servo motor 108 is in direct communication with the engine control unit (ECU) (not shown), which serves as the central processor for coordinating valve operation, combustion timing, and engine load management. The ECU typically employs a closed-loop feedback system, such as a proportional-integral-derivative (PID) controller or a model-based control strategy, to compare the actual valve position (obtained via a built-in encoder or resolver on the servo) with a target reference angle. Adjustments are then made in real time to align the position of the intake rotary valve opening with the desired IVC value. Additionally, the bidirectional servo motor 108 relies on feedback from a crankshaft position sensor (CKP) ((not shown), which provides high-resolution rotational data necessary to correlate valve events with piston movement. This sensor network enables the ECU to execute intelligent valve control strategies that improve engine torque, power output, and thermal efficiency. Overall, the servo-driven IVC mechanism, under electronic control and informed by sensor feedback, offers a modern and adaptive approach to IC engine efficiency enhancement.

The bidirectional servo motor 108 is used to control the intake valve in the Independent Rotary Valve (IRV) engine is a compact electric actuator capable of rotating in both directions to modulate intake valve timing. This motor is responsible for precisely adjusting the angular position of the inner rotary valve, enabling dynamic control over the intake valve closing (IVC) angle throughout the engine's operating rpm range. It operates under the direct command of the engine control unit (ECU), which issues control signals to regulate both the direction and magnitude of rotation.

Technically, the bidirectional servo motor 108 is most appropriately implemented as a brushless electric motor, commonly of the brushless DC (BLDC) type, due to its high responsiveness, efficiency, and precise controllability. These motors function using electronically commutated stator coils and a rotor fitted with permanent magnets. The ECU energizes specific coil phases in a controlled sequence to generate magnetic fields that drive the rotor in either direction, depending on the desired valve action. Position and speed feedback are typically handled via an integrated encoder or resolver, allowing the ECU to maintain closed-loop control over the valve's movement.

The internal construction of the bidirectional servo motor 108 includes copper windings for the stator, rare-earth magnets or ferrite-based magnets for the rotor, and laminated electrical steel for the core to optimize magnetic flux and reduce eddy current losses. Structural components, such as the housing and shaft, are made from aluminum alloys or stainless steel, chosen for their durability, lightweight characteristics, and thermal resistance. Sealing elements around the motor prevent contamination and ensure reliable operation within the thermal and mechanical environment of an internal combustion engine.

The independent rotary valve engine 100 further includes a cylinder block 110 connected to the engine crankcase 102.

The cylinder block 110, illustrated in FIGS. 1 and 2, is a structural component positioned atop the engine crankcase 102 and securely fastened to it. The cylinder block 110 defines one or more cylinders (bores within the block) in which the combustion process occurs. Each cylinder houses reciprocating components involved in the engine cycle. The cylinder block 110 is manufactured with dimensional control intended for proper sealing and movement of these components. The cylinder block 110 may incorporate integral cooling passages through which coolant circulates to manage the temperatures generated during combustion. The material for the cylinder block 110, in non-limiting examples commonly cast iron or aluminum alloy, is selected for attributes such as strength, thermal conductivity, and wear resistance. In a non-limiting example, the cylinder block 110 is made of aluminum, which has high thermal conductivity.

The independent rotary valve engine 100 further includes a cylinder head 112 connected to the cylinder block 110. The independent rotary valve engine 100 also includes a piston 114 located within a combustion chamber 116, formed partially by the cylinder block 110 and the cylinder head 112. The cylinder head 112, as shown in FIGS. 1 and 2, is secured to a top surface of the cylinder block 110, forming an enclosed volume above the cylinder bore, which defines part of the combustion chamber 116. The cylinder head 112 incorporates machined channels or bores designed to accommodate rotating valve components. Furthermore, the cylinder head 112 incorporates ports that interact with these valve components to control the inflow and outflow of gases relative to the combustion chamber 116. The cylinder head 112 and cylinder head 110 are made of the same material. In a non-limiting example, the cylinder head 112 and cylinder head 110 are both made of aluminum.

The piston 114, visible within the cylinder block 110 in FIG. 2, is a cylindrical component that reciprocates vertically inside a cylinder bore defined by the cylinder block 110. A top surface of the piston 114, along with the cylinder walls and the underside of the cylinder head 112, defines the combustion chamber 116, the volume where fuel-air mixture is compressed and ignited. The function of the piston 114 includes transmitting force generated by expanding gases during combustion to other components. The piston 114 also performs roles in the other strokes of the four-stroke cycle: drawing in fuel-air mixture during an intake stroke, compressing the mixture during a compression stroke, and expelling burnt exhaust gases during an exhaust stroke. The piston 114 is made from an aluminum alloy selected for its weight and thermal conductivity characteristics. Pistons are produced from cast or forged, high-temperature resistant aluminum silicon alloys. The piston 114 may be selected from any one of aluminum piston alloys AISI 12CuMgNi, AISI18 CuMgNi and AISI12 Cu4Ni2Mg. A suitable piston alloy is a eutectic Al/12% Si alloy containing approximately 1% each of copper, nickel and magnesium.

The independent rotary valve engine 100 further includes a connecting rod 118 attached between the piston 114 and the crankshaft 104. The connecting rod 118 is a link that serves as the mechanical interface between the piston 114 and the crankshaft 104. One end of the connecting rod 118 connects to the piston 114, typically via a piston pin, providing for pivoting motion relative to the piston 114. The other end connects to a crankpin on the crankshaft 104, usually incorporating a bearing shell to facilitate rotation as the crankshaft 104 turns. The connecting rod 118 is designed to withstand the compressive and tensile forces experienced during engine operation.

The connecting rod 118 is configured to convert the linear, reciprocating motion of the piston 114 into the rotational motion of the crankshaft 104. As the piston 114 moves up and down within the cylinder, the connecting rod 118 transmits this motion, causing the offset crankpin to rotate around the main axis of the crankshaft 104. The connecting rod 118 is typically manufactured from steel or other alloys, in non-limiting examples through processes such as forging or powder metallurgy, to achieve the required strength and fatigue resistance while managing weight.

The independent rotary valve engine 100 further includes an intake rotary valve 120 located within a first channel 122 in the cylinder head 112. As may be seen in FIG. 2, the intake rotary valve 120 is a cylindrical component housed within the first channel 122, which is a machined portion in the cylinder head 112. The first channel 122 serves as a bearing surface and guide for the rotation of the intake rotary valve 120. The function of the intake rotary valve 120 involves controlling the admission of gas (typically a fuel mixture) into the combustion chamber 116 during the intake stroke of the engine cycle. This control is achieved by the rotational positioning of the intake rotary valve 120, which selectively aligns or misaligns internal passages or ports within the valve with corresponding ports in the cylinder head 112 leading to the combustion chamber 116.

In an aspect of the present disclosure, the intake rotary valve 120 has a construction involving concentric components, which facilitates control over different aspects of the intake process. An inner valve portion 150 of the intake rotary valve 120 is driven rotationally by a pulley connected to the bidirectional servo motor 108, contributing to the control of intake timing and throttling function. An outer sleeve portion 152 is mechanically linked to the crankshaft 104, synchronizing a main port opening event with four-stroke cycle of the independent rotary valve engine 100. The rotational positioning and sealing of the intake rotary valve 120 within the first channel 122 are relevant for controlling gas flow and mitigating leakage.

The independent rotary valve engine 100 further includes an exhaust rotary valve 128 located within a second channel 126 in the cylinder head 112, wherein the second channel 126 is parallel to the first channel 122. Similar to the intake rotary valve 120, the exhaust rotary valve 128, as shown in FIG. 2, is a cylindrical component situated within the second channel 126 machined into the cylinder head 112. The exhaust rotary valve 128 is mechanically linked to the crankshaft 104 via a drive mechanism, causing its rotation to be synchronized with the engine cycle, specifically opening during the exhaust stroke. The exhaust rotary valve 128 is configured to control the expulsion of burnt combustion gases (exhaust) from the combustion chamber 116 during the exhaust stroke. This is achieved by rotating the exhaust rotary valve 128 to align or misalign a passage or port with corresponding ports in the cylinder head 112 leading from the combustion chamber 116.

The rotary valves used in the Independent Rotary Valve (IRV) engine of the present disclosure are manufactured from mild steel (MS), and selected for their machinability, structural integrity, and cost-effectiveness. The choice of mild steel balances the need for mechanical strength, thermal resistance, and machinability, particularly in operations requiring tight tolerances such as inner and outer concentric fits.

The independent rotary valve engine 100 further includes a pulley 130 connected to a servo motor shaft (not explicitly numbered but understood as an output shaft) of the bidirectional servo motor 108 and a first end 120a of the inner valve portion 150 of the intake rotary valve 120. The pulley 130, depicted schematically in FIGS. 1 and 2, serves as a component for transmitting rotational motion. The pulley 130 is mounted onto the servo motor shaft extending from the bidirectional servo motor 108. The pulley 130 may be connected to the first end 120a of the inner valve portion 150 of the intake rotary valve 120, potentially via a belt or other transmission mechanism. This connection forms the drive link between the bidirectional servo motor 108 and the portion of the intake rotary valve 120 that it controls.

The function of the pulley 130 is to transfer the controlled rotational output of the bidirectional servo motor 108 to the first end 120a of the inner valve portion 150 of the intake rotary valve 120. When the bidirectional servo motor 108 rotates its servo motor shaft in either a clockwise or counterclockwise direction based on control signals, the pulley 130 rotates correspondingly. This rotation is directly imparted to the connected portion of the intake rotary valve 120, causing it to change its angular position within the first channel 122 of the cylinder head 112. This mechanism provides the variable control of the intake process, as it defines the timing and extent of port alignment controlled by the servo-driven part of the intake rotary valve 120.

The independent rotary valve engine 100 further includes a spark plug 132 operatively connected within the cylinder head 112. The spark plug 132, visible extending into the upper part of the cylinder head 112 area in FIGS. 1 and 2, is an ignition device. The spark plug 132 is installed in a threaded port within the cylinder head 112 such that its electrodes protrude into the combustion chamber 116. The spark plug 132 is operatively connected to an ignition system controlled by the engine control device, which provides a high-voltage electrical pulse at specific times during the engine cycle.

The spark plug 132 is configured to initiate combustion of the compressed fuel-air mixture within the combustion chamber 116. Upon receiving the high-voltage pulse, an electrical arc jumps across the gap between the electrodes of the spark plug 132. This arc provides the energy required to ignite the surrounding fuel-air mixture, starting the power stroke of the engine cycle. The timing of this spark event relative to the piston position and crankshaft angle is controlled by the engine control device and is a factor in engine performance, efficiency, and emissions. The placement of the spark plug 132 within the cylinder head 112 is selected to promote effective and consistent flame propagation throughout the combustion chamber 116.

The independent rotary valve engine 100 further includes an engine control device (not shown) operatively connected to the spark plug 132 and the bidirectional servo motor 108. The engine control device (as discussed in reference to FIGS. 9-12) is an electronic processing device responsible for managing and coordinating various functions of the independent rotary valve engine 100. The engine control device receives input signals from various sensors (not explicitly shown but implied, e.g., engine speed sensor, throttle position sensor, temperature sensors, and the like) and processes this information using pre-programmed algorithms and calibration data. The engine control device is operatively connected via electrical wiring or communication buses to actuators, including the spark plug 132 and the bidirectional servo motor 108. The engine control device is configured to perform several key functions in the independent rotary valve engine 100, as discussed hereinafter.

The engine control device is configured to generate spark timing signals configured to actuate the spark plug 132 to combust a fuel mixture in the combustion chamber 116.

Herein, the spark timing signals are transmitted to the ignition system associated with the spark plug 132, defining the exact moments the spark plug 132 should fire to initiate combustion within the combustion chamber 116. This timing is calculated based on factors such as engine speed, load, temperature, and potentially other parameters to optimize the combustion process.

The engine control device is also configured to receive an engine speed requirement. The engine speed requirement may originate from driver input (e.g., accelerator pedal position) or other system demands, representing the desired operating state or power output from the independent rotary valve engine 100. This input serves as a primary basis for calculating the necessary adjustments to engine operating parameters, including valve timing and potentially fuel delivery.

The engine control device is further configured to determine a wide-open throttle position and an intake valve closing angle based on the engine speed requirement. Herein, the determination of the wide-open throttle (WOT) position relates to operating conditions where maximum air/fuel mixture intake is desired. The intake valve closing (IVC) angle refers to the specific crankshaft angle at which the intake rotary valve 120 (specifically, the servo-controlled portion) should close, terminating the intake flow into the combustion chamber 116. The determination of the appropriate IVC angle allows for defining variable valve timing, affecting the effective compression ratio and volumetric efficiency, specific different engine speeds and loads.

The engine control device is further configured to generate variable valve timing signals configured to cause the servo motor shaft to rotate in one of a clockwise direction and a counterclockwise direction based on the wide-open throttle position and the intake valve closing angle. The variable valve timing signals are specifically directed to the bidirectional servo motor 108. Based on the determined wide-open throttle position and intake valve closing angle (and potentially other parameters), the variable valve timing signals command the bidirectional servo motor 108 to rotate its servo motor shaft in one of the clockwise direction and the counterclockwise direction. This rotation adjusts the angular position of the servo-driven portion of the intake rotary valve 120, thereby implementing the desired intake valve closing timing and throttling effect directly at the intake port, as part of the variable valve actuation strategy.

Figure 3:
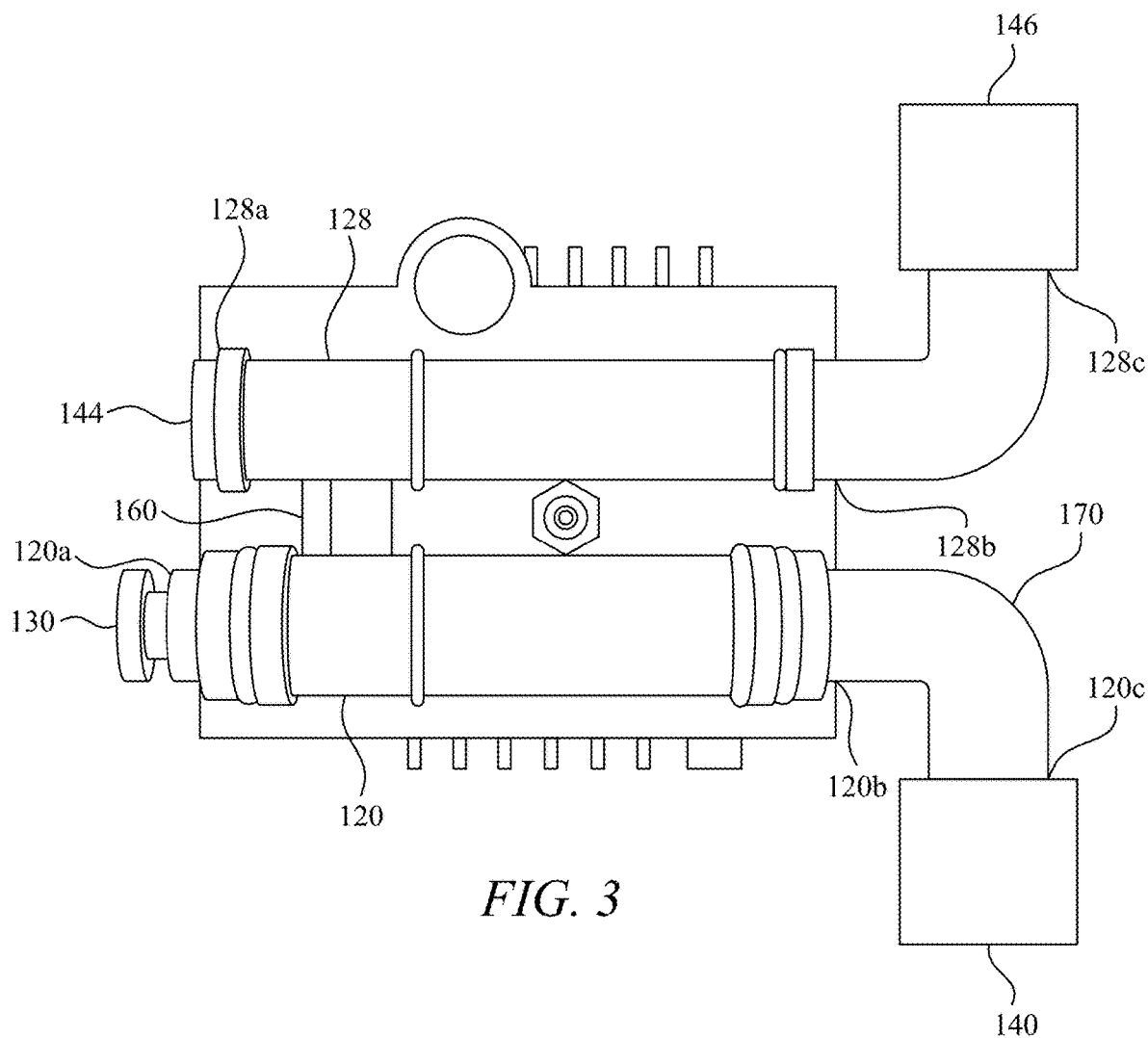
FIG. 3 is an exemplary diagram of an arrangement of an intake rotary valve and an exhaust rotary valve of the independent rotary valve engine, showing connections to an intake manifold and an exhaust manifold therein, according to certain embodiments.
Figure 4:
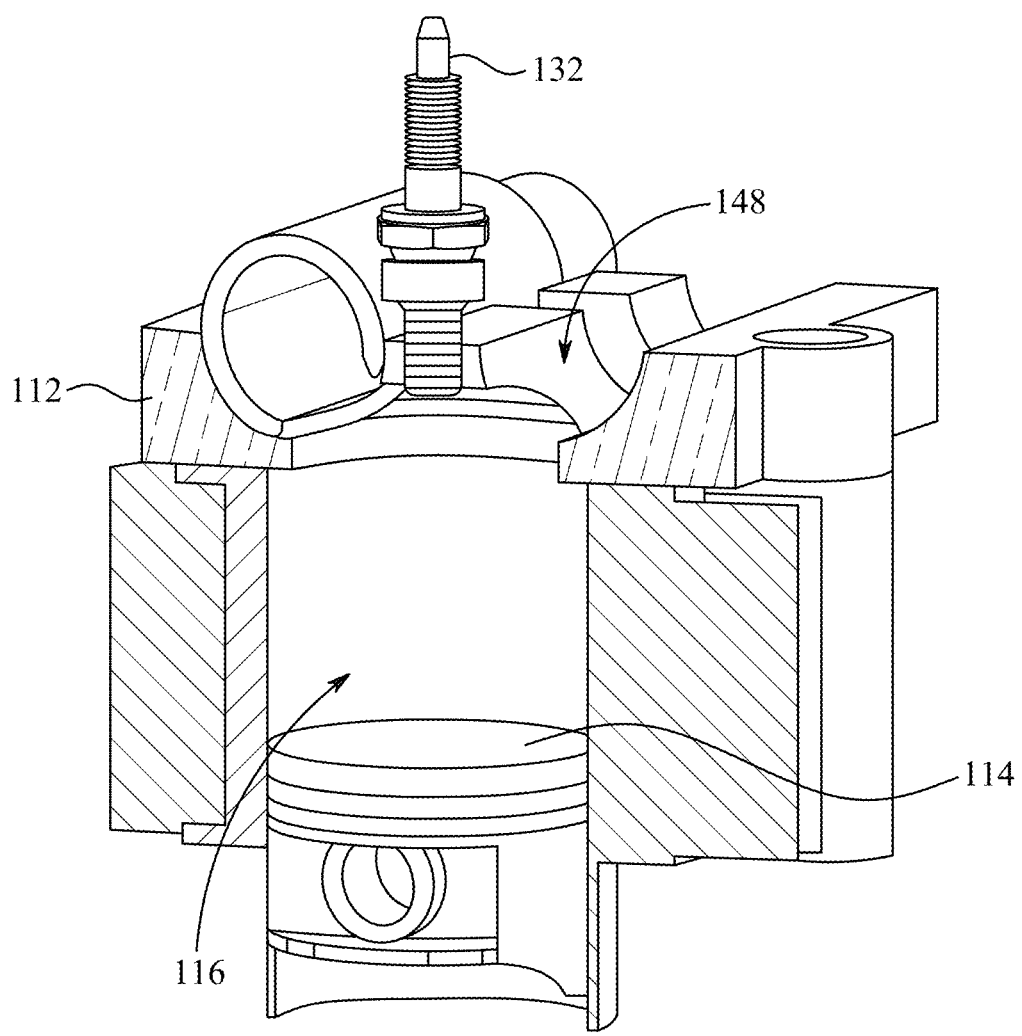
FIG. 4 is an exemplary diagram a portion of a cylinder head of the independent rotary valve engine showing port openings for the intake rotary valve and the exhaust rotary valve leading into a combustion chamber therein, according to certain embodiments.

Referring to FIG. 3, illustrated is an exemplary diagram showing a general arrangement of the intake rotary valve 120 and the exhaust rotary valve 128 relative to each other within the independent rotary valve engine 100, highlighting the parallel configuration of the two valves 120, 128. The parallel arrangement of the intake rotary valve 120 and the exhaust rotary valve 128 within the cylinder head 112 is an aspect of the geometric layout of the independent rotary valve engine 100. Further, FIG. 4 illustrates an exemplary diagram showing a cross-sectional view looking into the combustion chamber 116 from below the cylinder head 112, depicting the openings within the cylinder head 112 that correspond to the ports connecting the intake rotary valve 120 and the exhaust rotary valve 128 passages to the combustion chamber 116.

As shown in FIG. 3, the independent rotary valve engine further includes an intake manifold 140 connected by an intake manifold connection pipe 170 at position 120c. The intake manifold connection pipe 170 is connected to outer sleeve 152 of the intake rotary valve 120 at a second end 120b. The intake manifold 140 is a component or assembly of conduits designed to distribute air into the fuel to form the fuel mixture sent to the engine. The intake manifold 140 is physically connected to the second end 120b of the intake rotary valve 120, which is the end opposite the first end 120a connected to the pulley 130. This connection provides a sealed pathway for the fuel mixture to enter the intake rotary valve 120. The intake manifold 140 is configured to inject the fuel mixture into the second end 120b of the intake rotary valve 120. The intake manifold 140 receives the fuel mixture from an upstream source, such as a carburetor or fuel injection system (not shown), and channels it towards the intake rotary valve 120. The internal passages of the intake manifold 140 are designed to facilitate flow of the fuel mixture towards the second end 120b, minimizing pressure drops before the mixture enters the valve mechanism itself.

In an engine, the fuel mixture, or air-fuel ratio (AFR), is the ratio of air to fuel in the combustion process, and a crucial factor in engine performance, efficiency, and emissions. For gasoline engines, the ideal stoichiometric ratio is about 14.7 parts air to about 1 part fuel.

The independent rotary valve engine 100 further includes an intake rotary valve port 142 located on the intake rotary valve 120 between the first end 120a of the intake rotary valve 120 and the intake manifold 140 connection at the second end 120b. The intake rotary valve port 142, as better shown in FIG. 2, is an opening or aperture through the wall of the intake rotary valve 120. The position of the intake rotary valve port 142 along the length of the intake rotary valve 120 is such that it can align with a corresponding opening in the cylinder head 112 leading directly into the combustion chamber 116. The intake rotary valve port 142 is configured to release the fuel mixture into the combustion chamber 116. As the intake rotary valve 120 rotates within the first channel 122, the intake rotary valve port 142 periodically aligns with the port in the cylinder head 112 during the intake stroke. When aligned, the intake rotary valve port 142 provides a passage for the fuel mixture, supplied from the intake manifold 140 through the interior of the intake rotary valve 120 (or relevant part thereof), to flow into the combustion chamber 116 as the piston 114 moves downward. The size, shape, and timing of the alignment of the intake rotary valve port 142 directly controls the amount and duration of fuel mixture induction.

In an aspect, the intake rotary valve port 142 has an elliptical shape. Herein, a minor axis of the intake rotary valve port 142 is about 25% of a circumference of the intake rotary valve 120 and a major axis of the intake rotary valve port 142 is about 50% of the circumference of the intake rotary valve 120. This specific elliptical geometry influences the flow characteristics as the intake rotary valve port 142 opens and closes during valve rotation. The defined proportions of the major and minor axes relative to the valve circumference contribute to the flow rate profile during the intake event. For example, with an inner intake valve diameter of 20 mm (circumference approximately 62.8 mm), a minor axis of 16 mm is about 25.5% of the circumference, and a major axis of 34 mm is about 54.1% of the circumference, consistent with the stated approximate percentages.

The independent rotary valve engine 100 further includes a sealing cap 144 located on a first end 128a of the exhaust rotary valve 128. As shown in FIG. 3, the sealing cap 144 is positioned at the first end 128a of the exhaust rotary valve 128, which is the end corresponding generally to the location of the pulley 130 on the intake rotary valve 120. This sealing cap 144 serves to close off the first end 128a of the exhaust rotary valve 128. The sealing cap 144 prevents the escape of exhaust gases from the first end 128a of the exhaust rotary valve 128.

Further, as shown in FIG. 3, the independent rotary valve engine 100 further includes an exhaust manifold 146 connected to a second end 128*b* of the exhaust rotary valve 128. The exhaust manifold 146 is a component or assembly of conduits designed to collect exhaust gases from the engine. An exhaust manifold connection pipe is physically connected to the second end 128*b* of the exhaust rotary valve 128 and at a position 128*c* to the exhaust manifold 146. The exhaust manifold 146 receives exhaust gases that have passed through the exhaust rotary valve 128 from the combustion chamber 116. The internal passages of the exhaust manifold 146 are designed to collect these gases and direct them downstream with minimal flow restriction. This connection provides a sealed pathway for exhaust gases exiting the exhaust rotary valve 128 to be channeled away from the engine, typically towards an exhaust treatment system and/or tailpipe (not shown).

Referring again to FIG. 2, the independent rotary valve engine 100 further includes an exhaust rotary valve port 148 located on the exhaust rotary valve 128 between the sealed first end 128*a* and the second end 128*b*. The exhaust rotary valve port 148, generally similar to the intake rotary valve port 142, is an opening or aperture through the wall of the exhaust rotary valve 128. The position of the exhaust rotary valve port 148 along the length of the exhaust rotary valve 128 is such that it can align with a corresponding port in the cylinder head 112 leading directly from the combustion chamber 116. The exhaust rotary valve port 148 is configured to receive an exhaust gas from the combustion chamber 116 and release the exhaust gas into the exhaust manifold 146. As the exhaust rotary valve 128 rotates within the second channel 126, synchronized with the engine cycle, the exhaust rotary valve port 148 aligns with the port in the cylinder head 112 during the exhaust stroke. This alignment provides a passage for the high-pressure exhaust gases, pushed out by the rising piston 114, to flow from the combustion chamber 116, through the exhaust rotary valve port 148, into the interior of the exhaust rotary valve 128, and subsequently out through the second end 128*b* into the exhaust manifold 146. It may be understood that the size, shape, and timing of the alignment of the exhaust rotary valve port 148 control the exhaust gas expulsion process.

In an aspect, the exhaust rotary valve port 148 has an elliptical shape, similar to the intake rotary valve port 142. This elliptical shape affects the rate at which the exhaust passage opens and closes as the exhaust rotary valve 128 rotates. Further, herein, a minor axis of the exhaust rotary valve port 148 is about 25% of a circumference of the exhaust rotary valve 128 and a major axis of the exhaust rotary valve port 148 is about 50% of the circumference of the exhaust rotary valve 128. This geometry influences flow characteristics during the exhaust stroke. For instance, assuming the exhaust rotary valve 128 has a similar diameter to the intake outer sleeve diameter of 22 mm (circumference approx. 69.1 mm), a 16 mm minor axis would be ~23% and a 34 mm major axis would be ~49%. Alternatively, if its dimensions match the inner intake valve (20 mm diameter), the percentages align as calculated previously for the intake rotary valve port 142.

In an aspect, the intake rotary valve 120 includes an inner intake rotary valve shaft 150 which includes the first end 120*a* of the intake rotary valve 120. Herein, the first end 120*a* is connected to the pulley 130. The intake rotary valve 120 further includes an outer sleeve 152 configured to surround the inner intake rotary valve shaft 150. As shown in the exploded view of FIG. 2, the intake rotary valve 120 is constructed from two primary concentric components.

The inner intake rotary valve shaft 150 forms the central part of the assembly and includes the first end 120*a*, which serves as the connection point for the pulley 130 driven by the bidirectional servo motor 108. The outer sleeve 152 is a tubular component positioned around the inner intake rotary valve shaft 150, creating an annular space or interface between the two components. The outer surface of the outer sleeve 152 interfaces with the first channel 122 in the cylinder head 112.

This concentric arrangement facilitates the independent rotation of the inner intake rotary valve shaft 150 relative to the outer sleeve 152, although they may also rotate together depending on the control strategy and mechanical linkages. The inner intake rotary valve shaft 150, being directly connected to the bidirectional servo motor 108 via the pulley 130, is responsible for the variable timing aspect, particularly controlling closing angle and throttling of the intake rotary valve 120 by adjusting its angular position. The outer sleeve 152 typically carries the main port feature (and cooperates with a port feature on the inner intake rotary valve shaft 150) that aligns with the intake rotary valve port 142 for the primary intake event, and its rotation is synchronized with the crankshaft 104. The fuel mixture supplied from the intake manifold 140 may pass through passages within or between these components to reach the intake rotary valve port 142.

In the Independent Rotary Valve (IRV) engine, the inner intake rotary valve shaft 150 functions as a precision controlled intake valve, while the outer sleeve 152 serves as a synchronizing element that rotates in coordination with the engine's crankshaft. The outer sleeve 152 is mechanically linked to the engine crankshaft and rotates at a constant speed synchronized with the piston cycle. This ensures that the outer sleeve of the valve establishes the basic timing framework for the intake event. The inner intake valve 150, nested concentrically within the outer sleeve, is actuated independently via the pulley connected to the bidirectional servo motor. The rotation of the crankshaft is superimposed on the outer sleeve to fine tune the intake valve timing, particularly the intake valve closing (IVC) angle. This relative motion between the inner and outer components allows the valve opening duration to be dynamically varied. At any given moment, the combined angular alignment of the inner valve with the ports in the outer sleeve and cylinder head determines whether the intake pathway is open or closed. When both the ports of the inner valve and outer sleeve align, the passage is open; when they are offset, the flow is blocked.

In a non-limiting example, the inner intake rotary valve shaft 150 may have an inner diameter of approximately 20 millimeters (mm) and a wall thickness of approximately 2 mm. The outer sleeve 152 surrounding the inner intake rotary valve shaft 150 may have an inner diameter of approximately 22 mm and a wall thickness of approximately 6 mm. Correspondingly, the elliptical intake rotary valve port 142 (and potentially the exhaust rotary valve port 148) may have a major axis dimension of approximately 34 mm and a minor axis dimension of approximately 16 mm, as described previously. It may be appreciated that these dimensions are exemplary and may be varied based on specific engine design requirements and application scale.

Figure 5:
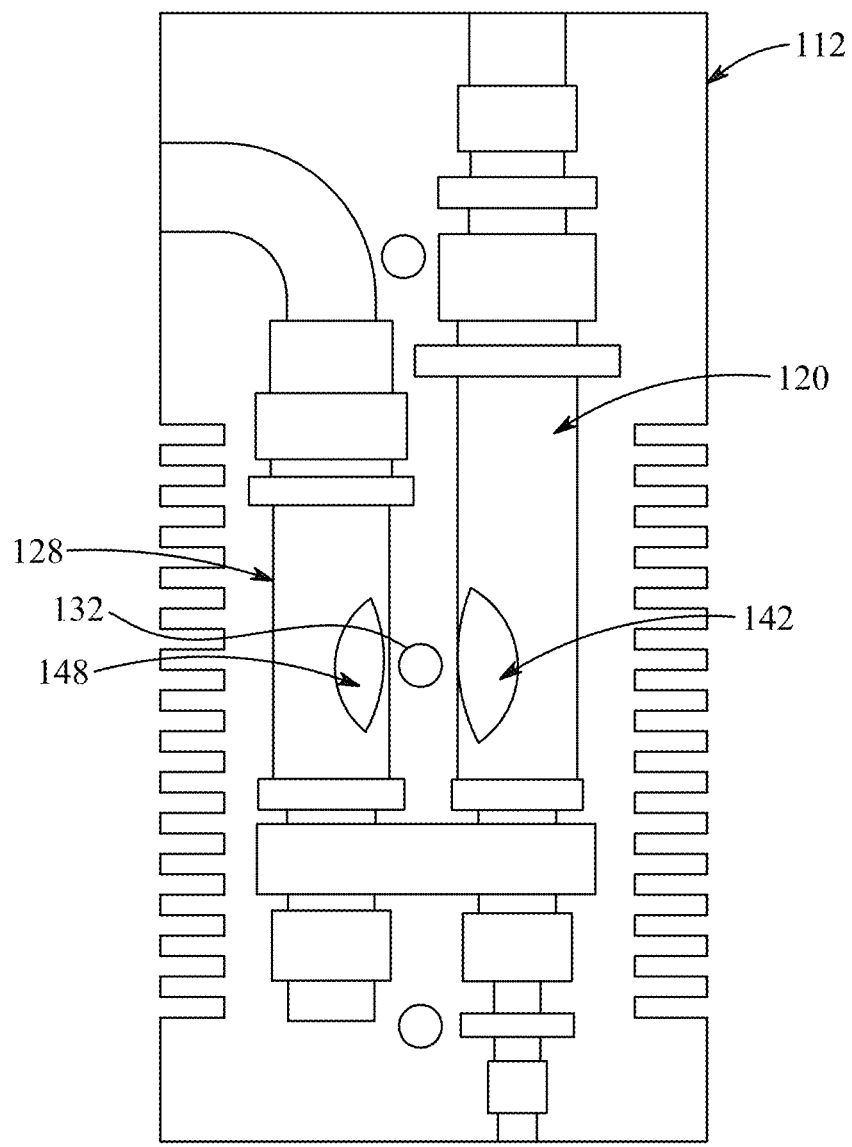
FIG. 5 is an exemplary sectional diagram of the cylinder head showing channels and port openings for the intake rotary valve and the exhaust rotary valve therein, according to certain embodiments.

Referring to FIG. 5, illustrated an exemplary sectional diagram of the cylinder head 112, providing a view through the first channel 122 and the second channel 126 that house the intake rotary valve 120 and the exhaust rotary valve 128, respectively. This view further clarifies the internal structure, showing the parallel arrangement of the channels 122, 126 and depicting the intake rotary valve port 142 (referring to the cylinder head port corresponding to the valve port) and the exhaust rotary valve port 148 (referring to the cylinder head port corresponding to the valve port) extending from these channels to the combustion chamber 116. The relative positions of features such as cooling fins and the locations for bearings and seals along the channels 122, 126 are also generally indicated.

In the design of the Independent Rotary Valve (IRV) engine of the present disclosure, the intake valve port 142 is intentionally made larger than the exhaust valve port 148, as illustrated in FIG. 5. This design decision is based on the differing functional requirements of the intake and exhaust processes in a four-stroke IC engine. The intake stroke relies primarily on atmospheric pressure to draw the air-fuel mixture into the cylinder, making it more sensitive to flow restrictions. A larger intake port reduces pressure losses and enhances volumetric efficiency by allowing a greater mass of air-fuel mixture to enter the cylinder in the limited time available during the intake stroke. In contrast, the exhaust stroke is driven by the high pressure generated during combustion, which naturally expels exhaust gases with greater force. As a result, a smaller exhaust port can still maintain sufficient flow without significantly compromising performance. The diameter of the intake valve port 142 is larger by a factor of 1.2 times that of the diameter of the exhaust valve port 148.

Figure 6:
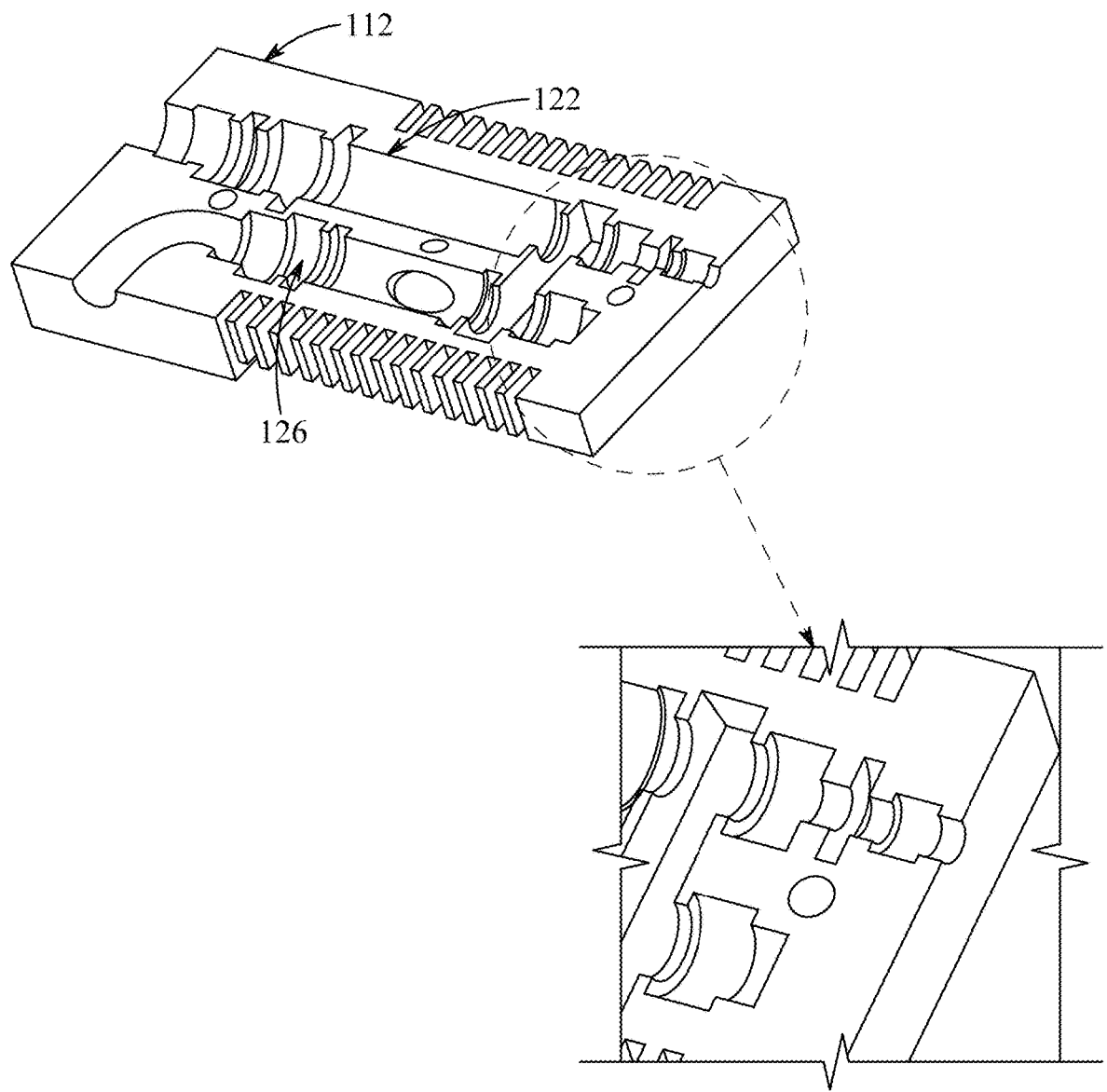
FIG. 6 is an exemplary sectional diagram of a portion of the cylinder head showing, in detail, indentations configured to receive bearings and seals for the intake rotary valve and the exhaust rotary valve, according to certain embodiments.

Further, FIG. 6 illustrates an exemplary detailed sectional diagram focusing on a portion of the cylinder head 112, specifically illustrating the nature of indentations designed to accommodate bearings and seals for the rotary valves 120, 128. This detailed view highlights features such as seal seats and bearing seats, which are machined grooves or steps within the cylinder head 112 (or potentially on the valve components themselves) configured to receive and locate the various bearing and seal elements described subsequently. These features provide positioning and support for the seals and bearings, contributing to their function in sealing and facilitating rotation.

The independent rotary valve engine 100 further includes a sprocket and chain mechanism 160 connected to the outer sleeve 152 of the intake rotary valve 120, to the exhaust rotary valve 128 and to the crankshaft 104. The sprocket and chain mechanism 160 (generally represented in FIG. 3) provides a mechanical linkage for synchronized rotation. The sprocket and chain mechanism 160 typically involves sprockets (toothed wheels) attached to the crankshaft 104, the outer sleeve 152 of the intake rotary valve 120, and the exhaust rotary valve 128, interconnected by a chain. The sprocket and chain mechanism 160 (as indicated in FIG. 3) is located adjacent to the first ends 120a, 128a of the rotary valves 120, 128. The sprocket and chain mechanism 160 is configured to rotate the outer sleeve 152 of the intake rotary valve 120 and the exhaust rotary valve 128 simultaneously based on the rotation of the crankshaft 104. As the crankshaft 104 rotates during engine operation, it drives the sprocket attached to it. This motion is transferred via the chain to the sprockets on the outer sleeve 152 and the exhaust rotary valve 128, causing them to rotate in a fixed timing relationship with the crankshaft 104. This synchronization coordinates the main opening and closing events of the intake (via the outer sleeve 152 port alignment) and exhaust valves with movement of the piston 114 through the four strokes (intake, compression, power, exhaust). The gear ratios of the sprockets determine the speed relationship, often being a 2:1 reduction (valves rotate once for every two crankshaft rotations) in typical four-stroke engines.

In the Independent Rotary Valve (IRV) engine configuration, both the outer intake valve sleeve and the exhaust rotary valve are mechanically driven by the crankcase of the engine via a sprocket and chain system, ensuring synchronized rotation with the crankshaft. The sprockets are mounted on the shafts of the rotary valves (outer sleeve and exhaust valve), with precise angular alignment maintained during assembly. The chain drive connects these sprockets to a corresponding sprocket on the crankshaft. Internally, mounting features are machined into the rotary valve shafts to accommodate the sprockets. These features include keyways for locking, ensuring that the sprockets do not slip under dynamic loads. The sprockets are located at the external ends of the rotary valve shafts, outside the combustion chamber but within sealed compartments of the engine head, accessible via side covers or housing extensions.

The independent rotary valve engine 100 further comprises a first inner intake rotary valve shaft bearing 162 located between the pulley 130 and the first end 120a of the inner intake rotary valve shaft 150, a first outer sleeve bearing 164 located near the first inner intake rotary valve shaft bearing 162, wherein the first outer sleeve bearing 164 is configured to rotatably connect the inner intake rotary valve shaft 150 to the outer sleeve 152, a first intake rotary valve seal 166 located between the first inner intake rotary valve shaft bearing 162 and the first outer sleeve bearing 164, wherein the first intake rotary valve seal 166 is configured to prevent loss of the fuel mixture from the first end 120a of the intake rotary valve 120, and a second intake rotary valve seal 168 located between the first outer sleeve bearing 164 and the intake rotary valve port 142, wherein the second intake rotary valve seal 168 is configured to prevent loss of the fuel mixture between the inner intake rotary valve shaft 150 and the outer sleeve 152. These components are located near the first end 120a of the intake rotary valve 120, as may be seen in FIG. 2, and are seated in indentations within the cylinder head 112 or valve components, as shown in FIG. 6 (showing generic bearing seats and seal seats).

Herein, the first inner intake rotary valve shaft bearing 162 provides rotational support for the inner intake rotary valve shaft 150 relative to the stationary cylinder head 112, situated near connection to the pulley 130. The first outer sleeve bearing 164, located nearby, facilitates relative rotation between the inner intake rotary valve shaft 150 and the outer sleeve 152, accommodating their potentially different rotational speeds or positions. The first intake rotary valve seal 166 is positioned axially between these two bearings (162, 164) and seals the interface near the first end 120a, mitigating leakage of fuel mixture outwards from the valve assembly. The second intake rotary valve seal 168 is located axially further along the valve, between the first outer sleeve bearing 164 and the intake rotary valve port 142, and seals the annular gap between the inner intake rotary valve shaft 150 and the outer sleeve 152, mitigating leakage of fuel mixture between these two rotating components before it reaches the port 142.

The independent rotary valve engine 100 further includes a second inner intake rotary valve shaft bearing 172 located on the second end of the intake rotary valve 120, wherein the second inner intake rotary valve shaft bearing 172 is configured to rotatably connect the second end of the inner intake rotary valve shaft 150 to the intake manifold connection pipe 170 of the intake manifold 140; a second outer sleeve bearing 174 located between the intake rotary valve port 142 and the second inner intake rotary valve shaft bearing 172; a third intake rotary valve seal 176 located between the second inner intake rotary valve shaft bearing 172 and the second outer sleeve bearing 174, wherein the third intake rotary valve seal 176 is configured to prevent loss of the fuel mixture between the second end of the inner intake rotary valve shaft 150 and the outer sleeve 152; and a fourth intake rotary valve seal 178 located adjacent to the second outer sleeve bearing 174, wherein the fourth intake rotary valve seal 178 is configured to prevent loss of the fuel mixture from the intake rotary valve port 142 area towards the outer sleeve 152 interface with the cylinder head 112. These components are located near the second end of the intake rotary valve 120, as may be seen in FIGS. 1, 2 and 3, and are seated in corresponding indentations (as depicted in FIG. 6).

Herein, the second inner intake rotary valve shaft bearing 172 provides rotational support for the second end 120b of the inner intake rotary valve shaft 150, interfacing with the connection pipe 170 leading to the intake manifold 140. The second outer sleeve bearing 174 supports the outer sleeve 152 relative to the cylinder head 112 or the inner intake rotary valve shaft 150 in this region, located between the intake rotary valve port 142 and the second inner intake rotary valve shaft bearing 172. The third intake rotary valve seal 176 seals the annular gap between the inner intake rotary valve shaft 150 and the outer sleeve 152 near the second end of the intake valve 120. The fourth intake rotary valve seal 178 seals the interface between the outer sleeve 152 and the cylinder head 112 (or possibly between inner/outer sleeves depending on design specifics) in the region near the intake rotary valve port 142 and the second outer sleeve bearing 174, mitigating leakage of fuel mixture outwards along the valve body. Together, these bearings and seals support the concentric valve components and manage fuel mixture containment at the second end 120b of the intake rotary valve 120.

The independent rotary valve engine 100 further includes a first exhaust rotary valve bearing 182 located adjacent the sealing cap 144 of the exhaust rotary valve 128; and a first exhaust rotary valve seal 184 located on the exhaust rotary valve 128 between the first exhaust rotary valve bearing 182 and the exhaust rotary valve port 148, wherein the first exhaust rotary valve seal 184 is configured to prevent backflow of the exhaust towards the first end 128a. These components are situated near the first end 128a of the exhaust rotary valve 128, corresponding to the location of the sprocket and chain mechanism 160, as generally indicated in FIG. 2, and reside within indentations in the cylinder head 112 or the exhaust rotary valve 128 (as depicted in FIG. 6).

The first exhaust rotary valve bearing 182 provides rotational support for the exhaust rotary valve 128 relative to the stationary cylinder head 112 near the first end 128a and adjacent to the sealing cap 144. The first exhaust rotary valve seal 184 is positioned axially between the first exhaust rotary valve bearing 182 and the exhaust rotary valve port 148. The function of the first exhaust rotary valve seal 184 is to seal the interface between the rotating exhaust rotary valve 128 and the stationary cylinder head 112, specifically mitigating the backflow or leakage of exhaust gases from the port region towards the first end 128a of the exhaust rotary valve 128, maintaining pressure within the exhaust passage.

The independent rotary valve engine 100 further includes a second exhaust rotary valve bearing 186 located on the second end 128b of the exhaust rotary valve 128, wherein the second exhaust rotary valve bearing 186 is configured to rotatably connect the second end 128b of the exhaust rotary valve 128 to a connection pipe 180 of the exhaust manifold 146; and a second exhaust rotary seal 188 located adjacent to the second exhaust rotary valve bearing 186 between the second exhaust rotary valve bearing 186 and the exhaust rotary valve port 148, wherein the second exhaust rotary seal 188 is configured to prevent loss of the exhaust from the second exhaust rotary valve bearing 186. These components are located near the second end 128b of the exhaust rotary valve 128, where it connects to the exhaust manifold 146, as indicated generally in FIG. 2.

The second exhaust rotary valve bearing 186 provides rotational support for the second end 128b of the exhaust rotary valve 128, potentially interfacing with the connection pipe 180 leading to the exhaust manifold 146. The second exhaust rotary seal 188 is positioned axially between the exhaust rotary valve port 148 and the second exhaust rotary valve bearing 186, adjacent to the second exhaust rotary valve bearing 186. The function of the second exhaust rotary seal 188 is to seal the interface between the rotating exhaust rotary valve 128 and the stationary cylinder head 112 or manifold connection near the second end 128b, mitigating leakage of exhaust gases outwards from the valve assembly in the vicinity of the second exhaust rotary valve bearing 186. Together, the bearings 182, 186 and the seals 184, 188 support the exhaust rotary valve 128 and manage exhaust gas containment.

In the configuration of the independent rotary valve engine 100, the intake rotary valve 120, comprising the inner intake rotary valve shaft 150 and the outer sleeve 152, is supported by multiple bearings. As illustrated, a total of four bearing locations may be utilized for the intake rotary valve 120, i.e., the first inner intake rotary valve shaft bearing 162, the first outer sleeve bearing 164, the second inner intake rotary valve shaft bearing 172, and the second outer sleeve bearing 174. Two of these bearings (162, 172) primarily support the rotation of the inner intake rotary valve shaft 150 relative to the cylinder head 112 or the connection pipe with the intake manifold 140, while the other two bearings 164, 174 support the outer sleeve 152 relative to the cylinder head 112 and/or facilitate relative motion between the inner shaft 150 and the outer sleeve 152. Similarly, the exhaust rotary valve 128 is supported by bearings at its ends. As described by the first exhaust rotary valve bearing 182 located near the first end 128a and the second exhaust rotary valve bearing 186 located near the second end 128b, a total of two bearing locations may be utilized to support the rotation of the exhaust rotary valve 128 within the second channel 126 of the cylinder head 112 and relative to connection of the exhaust manifold 146 via the connection pipe 180.

Further, the various seals, including the first intake rotary valve seal 166, the second intake rotary valve seal 168, the third intake rotary valve seal 176, the fourth intake rotary valve seal 178, the first exhaust rotary valve seal 184, and the second exhaust rotary seal 188, are selected to function effectively under the operating conditions within the independent rotary valve engine 100, including exposure to fuel mixtures, exhaust gases, and elevated temperatures. In some non-limiting examples, these seals may be spring-energized seals, potentially utilizing materials such as Polytetrafluoroethylene (PTFE) or similar polymers known for chemical resistance, temperature tolerance (e.g., capable of bearing temperatures up to approximately 600 Kelvin in some formulations), and low-friction characteristics. The spring energizer, if utilized, provides consistent sealing force to compensate for wear, pressure fluctuations, and thermal expansion, contributing to the sealing integrity between rotating and stationary components.

The Independent Rotary Valve (IRV) engine system incorporates specially selected bearings and seals to ensure precise rotary motion and containment of combustion gases within the compact, high-speed rotating environment of the valve assembly. The bearings used in the valve system are drawn cup needle roller bearings, chosen for their ability to provide high load capacity in a compact form factor with minimal radial clearance. The bearing selection was based on parameters such as load rating, operating temperature, and dimensional compatibility with the engine head geometry. Specific bearings include models such as HK1012, HK1812, HK2212, and HK2516, providing reliable operation up to speeds of 18,000 RPM and are capable of supporting dynamic loads up to 24 kN, The seals selected are PTFE (polytetrafluoroethylene) rotary lip seals, known for their exceptional thermal resistance (up to 300° C.), low coefficient of friction, and chemical inertness. PTFE seals are capable of handling pressures up to 12 MPa, making them well suited for containing combustion gases and maintaining pressure integrity within the valve housing. These seals are particularly effective in high-speed rotary applications due to their minimal wear and low drag, characteristics essential for the performance of the IRV system.

The dimensional integration of these components into the cylinder head involves precision-machined indentations or pockets to house the bearings and seals. These indentations are designed to ensure tight press fits. Proper alignment and axial retention are achieved through interference fits and the use of shoulders or grooves machined into the aluminum head.

In operation, the bidirectional servo motor 108 is configured to rotate the servo motor shaft to turn the pulley 130. Turning the pulley 130 is configured to rotate the inner intake rotary valve shaft 150 to one of move the inner intake rotary valve port 142 (feature on the inner intake rotary valve shaft 150, cooperating with the outer sleeve 152 or the intake rotary valve port 142) at least partially over the combustion chamber 116 opening to expel an air/fuel mixture into the combustion chamber 116 and to move the intake rotary valve port 142 away from the combustion chamber 116 opening to permit ignition of the air/fuel mixture by the spark plug 132. This is the primary actuation function controlled by the bidirectional servo motor 108. By rotating the inner intake rotary valve shaft 150, the bidirectional servo motor 108 controls the degree and timing of alignment between the port features on the inner intake rotary valve shaft 150 and the outer sleeve 152 (if applicable) and the corresponding port in the cylinder head 112. This controlled rotation performed by the bidirectional servo motor 108 directly manages the flow of the fuel mixture into the combustion chamber 116 during the intake phase. Rotating the inner intake rotary valve shaft 150 to achieve alignment permits fuel mixture entry. Rotating the inner intake rotary valve shaft 150 to cause misalignment closes off the passage, terminating the intake flow and sealing the combustion chamber 116 for the subsequent compression and power strokes, during which ignition occurs via the spark plug 132. The extent of partial opening or the precise timing of closing is determined by the variable valve timing signals from the engine control device.

Furthermore, the engine control device is configured to generate the variable valve timing signals to actuate the bidirectional servo motor 108 to rotate the servo motor shaft to turn the pulley 130 and rotate the inner intake rotary valve shaft 150 (influencing the effective position of the intake rotary valve port 142) to one of a fully open position, a partially open position, an idling position and a fully closed position based on the wide-open throttle position and the intake valve closing angle determined by the engine control device. These positions correspond conceptually to the relative alignments shown in FIG. 7A (full-throttle, maximum overlap), FIG. 7B (part-throttle, reduced overlap), FIG. 7C (idling, minimal overlap), and FIG. 7D (cylinder deactivated, no overlap/closed). The engine control device translates the calculated WOT status and IVC angle into specific commands for the bidirectional servo motor 108 to achieve the desired level of intake port opening or closure. This actuation adjusts the amount of air/fuel mixture entering the combustion chamber 116 (throttling function) and the duration of the intake event (IVC timing). A fully open position corresponds to maximum mixture intake, typically under high load or WOT conditions. Partially open positions provide reduced mixture flow for part-load operation. An idling position provides the minimum flow required to sustain engine operation at idle speed. A fully closed position (or cylinder deactivated position as in FIG. 7D) prevents mixture intake altogether, potentially used during deceleration fuel cut-off or cylinder deactivation strategies for fuel economy. The ability to dynamically adjust to these positions by the engine control device, via the bidirectional servo motor 108, is a feature of the variable valve actuation system, in the independent rotary valve engine 100.

In determining the variable valve timing signals, the engine control device may employ control algorithms, potentially utilizing lookup tables or mathematical models based on calibration data derived from engine testing and simulation. These algorithms process inputs such as the engine speed requirement, measured engine speed (from a sensor, not shown), engine load, and potentially other parameters like temperatures, to calculate the precise target angular position for the inner intake rotary valve shaft 150. The generated variable valve timing signals may represent position commands sent to the bidirectional servo motor 108, possibly incorporating feedback control loops (using position sensors associated with the bidirectional servo motor 108 or the intake rotary valve 120, not shown) to achieve positioning. The purpose of this dynamic control, facilitated by the engine control device and the bidirectional servo motor 108, is to implement variable valve actuation (VVA), specifically adjusting the intake valve closing (IVC) angle and providing throttling directly at the intake rotary valve port 142. This approach, by controlling flow at the port, may contribute to reduced pumping losses compared to conventional throttle bodies and optimize volumetric efficiency across different operating conditions, including wide-open throttle (WOT) operation.

In the synchronized operation of the valves, the exhaust rotary valve port 148 is configured to be in an open position over the combustion chamber 116 when the intake rotary valve port 142 is in the fully closed position. Specifically, the exhaust rotary valve port 148 is in the open position over the combustion chamber 116, when the intake rotary valve port 142, as controlled by rotation of both the inner intake rotary valve shaft 150 and the outer sleeve 152, is in the fully closed position during the exhaust stroke. This relationship is governed by the fixed timing provided by the sprocket and chain mechanism 160 linking the crankshaft 104, the outer sleeve 152, and the exhaust rotary valve 128. During the exhaust stroke, the sprocket and chain mechanism 160 rotates the exhaust rotary valve 128 so that the exhaust rotary valve port 148 aligns with the cylinder head port, allowing exhaust gases to exit. Simultaneously, the outer sleeve 152 is rotated such that its port feature is not aligned with the cylinder head port, contributing to the intake side being closed. The inner intake rotary valve shaft 150, controlled by the bidirectional servo motor 108, would also be positioned by the engine control device to maintain closure during the exhaust stroke. Conversely, during the intake stroke, the outer sleeve 152 and the inner intake rotary valve shaft 150 align to open the intake port 142, while the exhaust rotary valve 128 is rotated by the sprocket and chain mechanism 160 so the exhaust rotary valve port 148 is closed relative to the combustion chamber 116.

FIGS. 7A, 7B, 7C, and 7D are exemplary schematic diagrams illustrating different operational states of the intake rotary valve 120 by showing the relative positions of port features associated with the inner intake rotary valve shaft 150 and the outer sleeve 152. These diagrams represent cross-sections through the intake rotary valve 120, depicting how the degree of overlap between an inner port feature (controlled by the inner intake rotary valve shaft 150) and an outer port feature (associated with the outer sleeve 152) changes based on the rotational position commanded by the engine control device via the bidirectional servo motor 108. This variable overlap directly influences the effective area through which the fuel mixture can pass into the cylinder head port leading to the combustion chamber 116, thus achieving throttling and variable intake control.

Figure 7A:
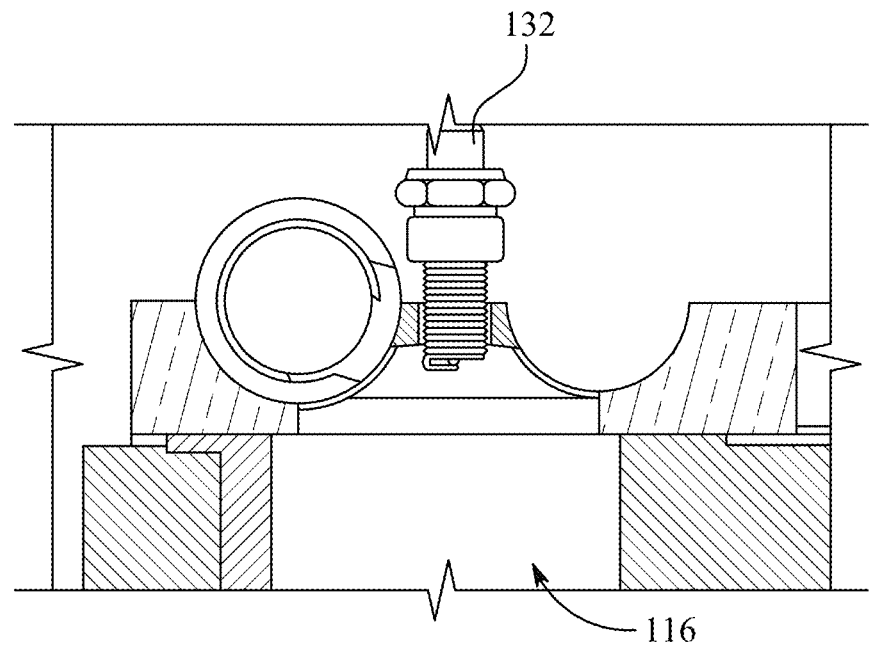
FIG. 7A is an exemplary schematic diagram showing relative positions of the inner intake rotary valve shaft port and the outer sleeve port during a full-throttle condition, according to certain embodiments.

FIG. 7A specifically illustrates the relative positions during a full-throttle condition. In this state, corresponding to maximum demanded power or acceleration, the engine control device signals the bidirectional servo motor 108 to rotate the inner intake rotary valve shaft 150 to a position where the inner port feature shows maximum overlap with the outer port feature. This alignment creates the largest possible effective opening (corresponding to the intake rotary valve port 142 functionality) for the fuel mixture to flow from the intake manifold 140, through the intake rotary valve 120, and into the combustion chamber 116 during the intake stroke (when the outer sleeve 152 port feature is also aligned with the cylinder head port). This condition maximizes volumetric efficiency and air/fuel charge delivery for peak performance, consistent with a wide-open throttle operational strategy.

Figure 7B:
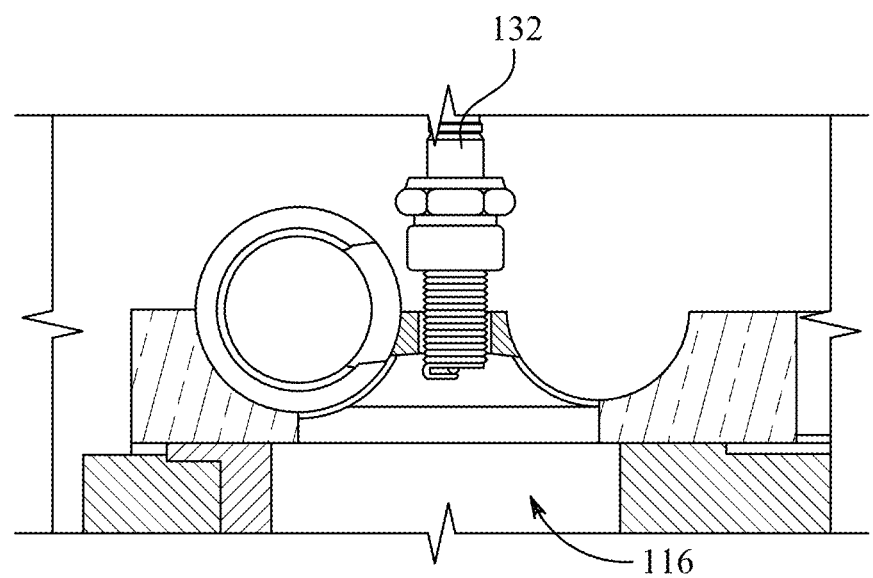
FIG. 7B is an exemplary schematic diagram showing relative positions of the inner intake rotary valve shaft port and the outer sleeve port during a part-throttle condition, according to certain embodiments.

FIG. 7B illustrates the relative positions during a part-throttle condition. This represents typical cruising or moderate acceleration scenarios where less than maximum power is required. The engine control device commands the bidirectional servo motor 108 to position the inner intake rotary valve shaft 150 such that there is only partial overlap between the inner port feature and the outer port feature. This reduced overlap results in a smaller effective flow area compared to the full-throttle condition. Consequently, the amount of fuel mixture entering the combustion chamber 116 per intake stroke is reduced, achieving the throttling effect necessary for part-load operation and contributing to fuel efficiency. The degree of partial overlap can be varied based on the specific engine speed requirement and load.

Figure 7C:
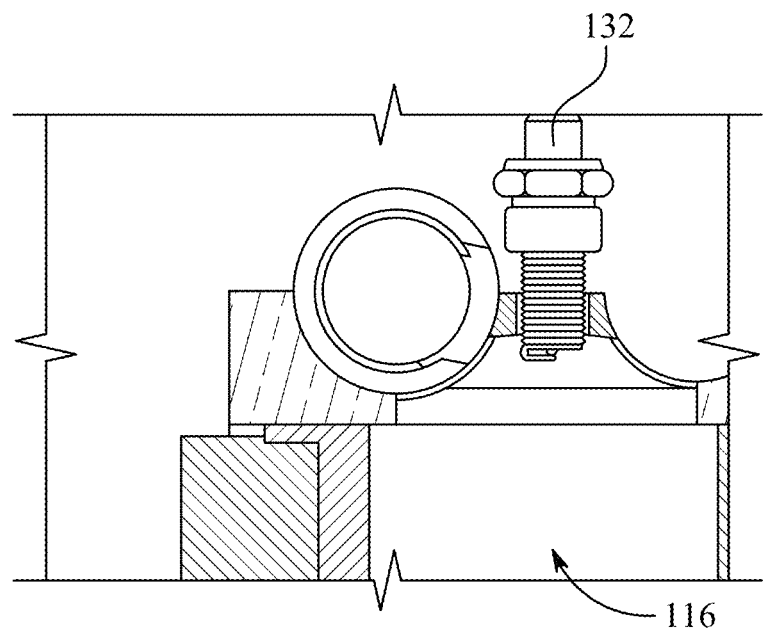
FIG. 7C is an exemplary schematic diagram showing relative positions of the inner intake rotary valve shaft port and the outer sleeve port during an idling condition, according to certain embodiments.

FIG. 7C illustrates the relative positions during an idling condition. When the independent rotary valve engine 100 is idling, a small amount of fuel mixture is needed to maintain operation against internal friction and accessory loads. The engine control device directs the bidirectional servo motor 108 to rotate the inner intake rotary valve shaft 150 to a position where the overlap between the inner and outer port features is minimal, creating a restricted flow path. This limits the fuel mixture entering the combustion chamber 116, providing for the engine to operate at a low, stable idle speed while minimizing fuel consumption. This represents a near-closed throttling state achieved directly at the valve.

Figure 7D:
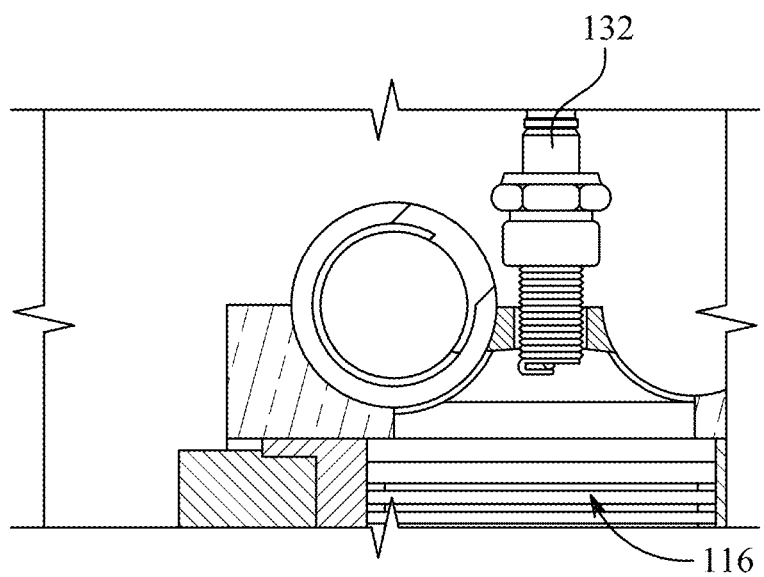
FIG. 7D is an exemplary schematic diagram showing relative positions of the inner intake rotary valve shaft port and the outer sleeve port during a cylinder deactivated condition, according to certain embodiments.

FIG. 7D illustrates the relative positions during a cylinder deactivated condition or potentially during fuel cut-off events like deceleration. In this state, fuel delivery to the cylinder may be stopped for fuel saving or emissions control. The engine control device commands the bidirectional servo motor 108 to rotate the inner intake rotary valve shaft 150 to a position where there is no overlap between the inner port feature and the outer port feature. This effectively closes the intake passage (intake rotary valve port 142 functionality) completely, preventing fuel mixture from entering the combustion chamber 116, even when the outer sleeve 152 port feature might align with the cylinder head port during the intake stroke phase. This demonstrates the capability for intake flow cut-off directly via the servo-controlled inner valve component.

Figure 8:
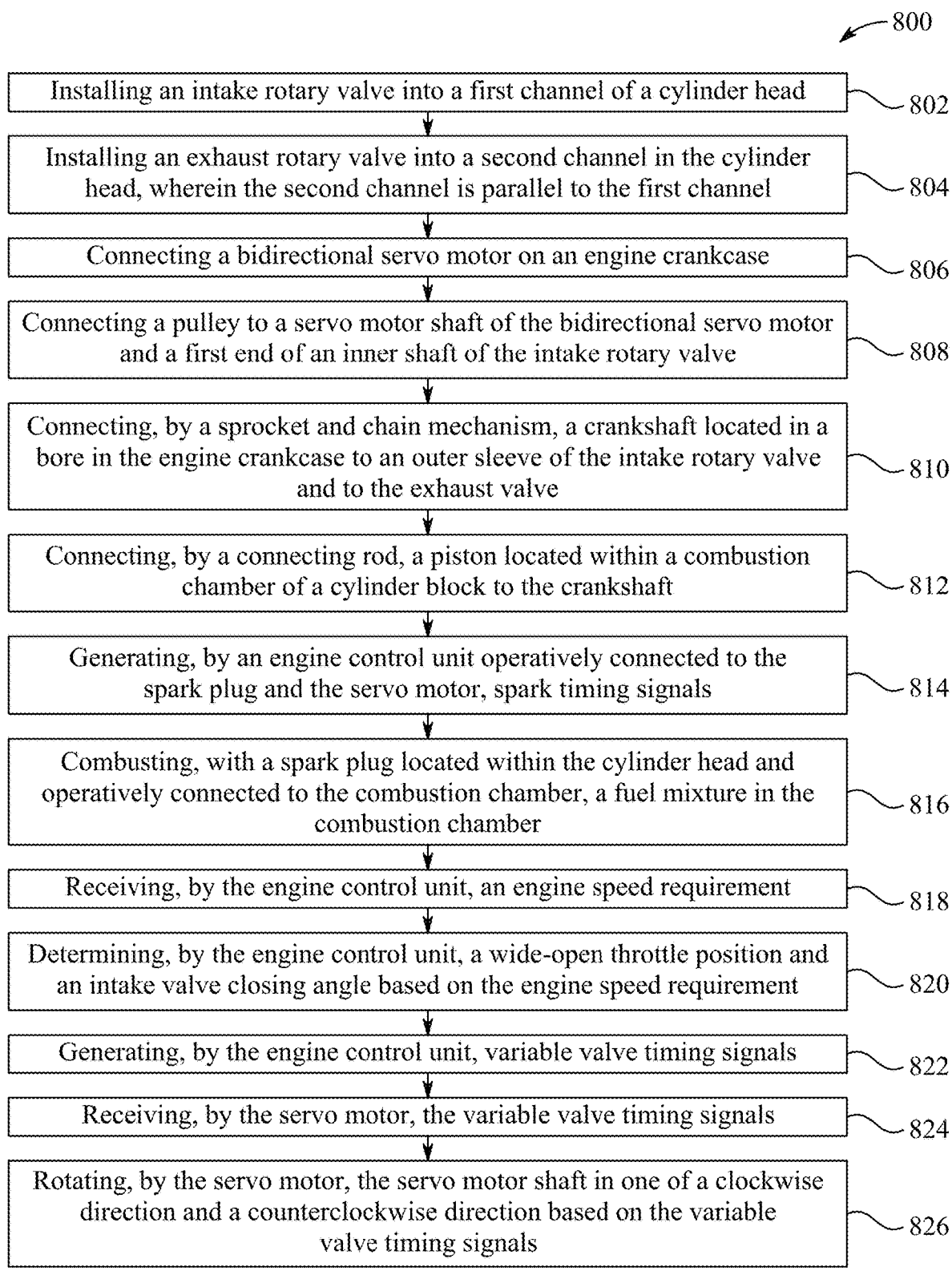
FIG. 8 is an exemplary flowchart of a method for controlling an independent rotary valve engine, according to certain embodiments.

Referring now to FIG. 8, illustrated is an exemplary flowchart listing steps involved in a method 800 for controlling the independent rotary valve engine 100, according to aspects of the disclosure. The method 800 outlines procedural steps related to the assembly and functional control of the independent rotary valve engine 100.

At step 802, the method 800 includes installing the intake rotary valve 120 into the first channel 122 of the cylinder head 112. This involves the physical placement and securing of the intake rotary valve 120, comprising the inner intake rotary valve shaft 150 and the outer sleeve 152, within the corresponding machined bore, defining the first channel 122, located within the cylinder head 112. The installation ensures that the intake rotary valve 120 can rotate freely within the first channel 122 and that its ports can properly align with the corresponding ports machined into the cylinder head 112 leading to the combustion chamber 116 and the intake manifold 140. The installation process also includes the proper placement of associated bearings 162, 164, 172, 174 and seals 166, 168, 176, 178 within their respective seats in the cylinder head 112 or on the valve components themselves, which occurs concurrently or sequentially with the valve insertion.

At step 804, the method 800 includes installing the exhaust rotary valve 128 into the second channel 126 in the cylinder head 112, wherein the second channel 126 is parallel to the first channel 122. Similar to the previous step, this involves positioning and securing the exhaust rotary valve 128 within its designated machined bore, the second channel 126, inside the cylinder head 112. The second channel 126 is located parallel to the first channel 122, as depicted in FIG. 5. Proper alignment is necessary for the free rotation of the exhaust rotary valve 128 and the correct interaction of the exhaust rotary valve port 148 with the cylinder head port leading from the combustion chamber 116 and the port leading to the exhaust manifold 146. This installation step also incorporates the placement of the required exhaust valve bearings 182, 186 and seals 184, 188 within their designated seats in the cylinder head 112.

At step 806, the method 800 includes connecting the bidirectional servo motor 108 on the engine crankcase 102. This involves mechanically mounting the bidirectional servo motor 108 to a designated location on the exterior or integrated structure of the engine crankcase 102. This mounting provides a stable platform for the bidirectional servo motor 108, preventing unwanted movement during operation and ensuring proper alignment of its output shaft with the components it drives. The connection may involve fasteners like bolts or screws interfacing with mounting bosses or brackets on the engine crankcase 102 and the housing of the bidirectional servo motor 108. Electrical connections for power and control signals to the bidirectional servo motor 108 are also established, linking it to the engine control device.

At step 808, the method 800 includes connecting the pulley 130 to the servo motor shaft of the bidirectional servo motor 108 and the first end 120*a* of the inner intake rotary valve shaft 150. This establishes the mechanical power transmission link from the bidirectional servo motor 108 to the component it directly controls within the intake rotary valve 120. The pulley 130 is secured to the output shaft of the bidirectional servo motor 108. Subsequently, a connection, typically involving a belt or direct coupling depending on the specific design, is made between the pulley 130 and the first end 120*a* of the inner intake rotary valve shaft 150. This ensures that rotation of the servo motor shaft results in a corresponding rotation of the inner intake rotary valve shaft 150.

At step 810, the method 800 includes connecting, by the sprocket and chain mechanism 160, the crankshaft 104 located in the bore 106 in the engine crankcase 102 to the outer sleeve 152 of the intake rotary valve 120 and to the exhaust rotary valve 128. This involves installing the components of the sprocket and chain mechanism 160, including sprockets secured to the crankshaft 104, the outer sleeve 152, and the exhaust rotary valve 128, and routing the chain around these sprockets. Proper tensioning and timing alignment are set during this installation to establish the fixed rotational relationship between the crankshaft 104 and the driven valve components (i.e., the outer sleeve 152 and the exhaust rotary valve 128). This connection synchronizes the primary valve opening events with motion of the piston 114 according to the four-stroke cycle requirements.

At step 812, the method 800 includes connecting, by the connecting rod 118, the piston 114 located within the combustion chamber 116 of the cylinder block 110 to the crankshaft 104. This assembly involves linking the reciprocating piston 114 to the rotating crankshaft 104. Herein, the small end of the connecting rod 118 is attached to the piston 114 using a piston pin, while the big end of the connecting rod 118 is assembled around a crankpin of the crankshaft 104, typically including bearing shells. This connection converts the linear motion of the piston 114, driven by combustion pressure, into the rotational output motion of the crankshaft 104.

At step 814, the method 800 includes generating, by the engine control device operatively connected to the spark plug 132 and the bidirectional servo motor 108, spark timing signals. This step is performed continuously by the engine control device during engine running conditions. The engine control device calculates the optimal timing for ignition based on inputs from various sensors monitoring engine operating parameters like speed and load. Based on these calculations, the engine control device generates precisely timed electrical signals (spark timing signals) that are sent to the ignition system to trigger the spark plug 132.

At step 816, the method 800 includes combusting, with the spark plug 132 located within the cylinder head 112 and operatively connected to the combustion chamber 116, a fuel mixture in the combustion chamber 116. This represents the core power-producing process in the engine cycle. Herein, following the generation of the spark timing signal, the spark plug 132 discharges a spark across its electrodes within the combustion chamber 116. This spark ignites the compressed fuel-air mixture present in the combustion chamber 116, initiating rapid combustion. The resulting expansion of high-pressure gases forces the piston 114 downward, producing the power stroke.

At step 818, the method 800 includes receiving, by the engine control device, the engine speed requirement. This involves the engine control device acquiring information representing the desired operational speed or power output for the independent rotary valve engine 100. This requirement typically originates from driver input via an accelerator pedal sensor or from other vehicle system requests. This input signal is processed by the engine control device for determining appropriate control actions for fuel delivery, spark timing, and valve timing.

At step 820, the method 800 includes determining, by the engine control device, the wide-open throttle position and the intake valve closing angle based on the engine speed requirement. That is, based on the received engine speed requirement and potentially other inputs like measured engine load or operating conditions, the engine control device calculates the target operating parameters for the intake system. This includes determining if the wide-open throttle (WOT) condition is requested (requiring maximum air/fuel intake) and calculating the specific, optimal intake valve closing (IVC) angle (the crankshaft position at which intake flow should cease) suitable for the current operating point to optimize performance and efficiency.

At step 822, the method 800 includes generating, by the engine control device, the variable valve timing signals. That is, once the required intake valve closing angle and the throttle position are determined, the engine control device generates the corresponding control signals intended for the bidirectional servo motor 108. These variable valve timing signals encode the command necessary to move the inner intake rotary valve shaft 150 to the precise angular position that achieves the target IVC angle and effective throttle opening, as illustrated conceptually in FIGS. 7A-7D.

At step 824, the method 800 includes receiving, by the bidirectional servo motor 108, the variable valve timing signals. The electrical signals generated by the engine control device (at step 822) are transmitted through wiring to the bidirectional servo motor 108. The internal circuitry of the bidirectional servo motor 108 receives and interprets these signals as instructions for rotation.

At step 826, the method 800 includes rotating, by the bidirectional servo motor 108, the servo motor shaft in one of a clockwise direction and a counterclockwise direction based on the variable valve timing signals. That is, in response to receiving the variable valve timing signals, the bidirectional servo motor 108 actuates its internal motor components. This causes the servo motor shaft, and consequently the connected pulley 130 and the inner intake rotary valve shaft 150, to rotate either clockwise or counterclockwise as needed to reach the target angular position defined by the signals. This physical rotation adjusts the intake valve timing and throttling effect dynamically during engine operation.

In an aspect, the method 800 further includes rotating, by the sprocket and chain mechanism 160 connected to the crankshaft 104, the exhaust rotary valve 128 to one of: a position in which the exhaust rotary valve port 148 is over an opening to the combustion chamber 116 after the combustion of the fuel mixture in the combustion chamber 116 and releasing an exhaust gas to the exhaust manifold 146, and a position in which the exhaust rotary valve port 148 is not over the opening to the combustion chamber 116 when the intake rotary valve port 142 is open to the combustion chamber 116. Thereby, the rotation imparted by the crankshaft 104 through the sprocket and chain mechanism 160 ensures the exhaust rotary valve 128 opens during the exhaust stroke by aligning the exhaust rotary valve port 148 with the cylinder head port, allowing burnt gases release. During other strokes, particularly the intake stroke when the intake rotary valve port 142 is open, the sprocket and chain mechanism 160 rotates the exhaust rotary valve 128 to misalign the exhaust rotary valve port 148, keeping the exhaust passage closed relative to the combustion chamber 116.

The method 800 further includes receiving, from the intake manifold 140 connected to the inner intake rotary valve shaft 150 (via the second end 120*b*), the fuel mixture; rotating, by the pulley 130, the inner intake rotary valve shaft 150 to the position in which the intake rotary valve port 142 is open to the combustion chamber 116; injecting, through the intake rotary valve port 142, the fuel mixture into the combustion chamber 116; and rotating, by the pulley 130, the inner intake rotary valve shaft 150 to a position in which the intake rotary valve port 142 is not open to the combustion chamber 116 after injecting the fuel mixture into the combustion chamber 116. This sequence details the servo-controlled intake process. Herein, fuel mixture is continuously available from the intake manifold 140. The bidirectional servo motor 108, via the pulley 130, rotates the inner intake rotary valve shaft 150 (in coordination with rotation of the outer sleeve 152) to open the effective intake rotary valve port 142 during the intake stroke, allowing injection or flow of the mixture into the combustion chamber 116. Subsequently, based on the determined IVC angle, the bidirectional servo motor 108 rotates the inner intake rotary valve shaft 150 via the pulley 130 to close the intake rotary valve port 142, ending the injection/flow for that cycle.

The method 800 further includes rotating, based on the variable valve timing signals, the bidirectional servo motor shaft to turn the pulley 130; and rotating, by the pulley 130, the inner intake rotary valve shaft 150 (thus adjusting the intake rotary valve port 142) to one of a fully open position, a partially open position, an idling position and a fully closed position based on the wide-open throttle position and the intake valve closing angle. Herein, the variable valve timing signals generated by the engine control device directly command the bidirectional servo motor 108 to achieve these specific states of valve opening (fully open, partially open, idling, fully closed) by precisely positioning the inner intake rotary valve shaft 150 via the pulley 130 connection. This implements the variable throttling and IVC timing determined by the engine control device based on operating conditions.

The method 800 further includes installing the first inner intake rotary valve shaft bearing 162 between the pulley 130 and the first end 120*a* of the inner intake rotary valve shaft 150; rotatably connecting, by the first outer sleeve bearing 164 installed near the first inner intake rotary valve shaft bearing 162, the inner intake rotary valve shaft 150 to the outer sleeve 152; preventing loss of the fuel mixture from the first end 120*a* of the intake rotary valve 120 by installing the first intake rotary valve seal 166 between the first inner intake rotary valve shaft bearing 162 and the first outer sleeve bearing 164; preventing loss of the fuel mixture between the inner intake rotary valve shaft 150 and the outer sleeve 152, by installing the second intake rotary valve seal 168 between the first outer sleeve bearing 164 and the intake rotary valve port 142; installing the second inner intake rotary valve shaft bearing 172 on the second end 120*b* to rotatably connect the second end 120*b* of the inner intake rotary valve shaft 150 to the connection pipe 170 of the intake manifold 140; installing the second outer sleeve bearing 174 between the intake rotary valve port 142 and the second inner intake rotary valve shaft bearing 172; preventing loss of the fuel mixture between the second end 120*b* of the inner intake rotary valve shaft 150 and the outer sleeve 152 by installing the third inner intake rotary valve shaft seal 176 between the second inner intake rotary valve shaft bearing 172 and the second outer sleeve bearing 174; and preventing loss of the fuel mixture from the intake rotary valve port 142 area to the outer sleeve 152 by installing the fourth intake rotary valve seal 178 adjacent to the second outer sleeve bearing 174. These sub-steps detail the assembly procedures related to the bearings and seals of the intake rotary valve 120. Each bearing 162, 164, 172, 174 is installed in its respective seat to provide rotational support between components (inner shaft/head, inner shaft/outer sleeve, outer sleeve/head). Each seal 166, 168, 176, 178 is installed in its respective seat (e.g., 190) at the specified axial locations to perform its designated sealing function: preventing leakage from the first end 120*a* (via the first intake rotary valve seal 166), between the inner shaft 150 and outer sleeve 152 near the first end (via the second intake rotary valve seal 168), between the inner shaft 150 and the outer sleeve 152 near the second end 120*b* (via the third intake rotary valve seal 176), and between the outer sleeve 152 and the cylinder head 112 near the intake rotary valve port 142 (via the fourth intake rotary valve seal 178).

The method 800 further includes installing the first exhaust rotary valve bearing 182 adjacent the sealing cap 144 of the exhaust rotary valve 128; preventing backflow of the exhaust towards the first end 128*a* by installing the first exhaust rotary valve seal 184 on the exhaust rotary valve 128 between the first exhaust rotary valve bearing 182 and the exhaust rotary valve port 148; rotatably connecting the second end 128*b* of the exhaust rotary valve 128 to the connection pipe 180 of the exhaust manifold 146 by installing the second exhaust rotary valve bearing 186 on the second end 128*b* of the exhaust rotary valve 128; and preventing loss of the exhaust from the second exhaust rotary valve bearing 186 area by installing the second exhaust rotary valve seal 188 located adjacent to the second exhaust rotary valve bearing 186 between the second exhaust rotary valve bearing 186 and the exhaust rotary valve port 148. These steps detail the assembly procedures for the exhaust rotary valve bearings and seals. Herein, the bearings 182, 186 are installed in their seats to support the exhaust rotary valve 128 rotationally at both ends. The seals 184, 188 are installed in their seats at the specified locations to prevent exhaust gas leakage towards the first end 128*a* (via the first exhaust rotary valve seal 184) and outwards near the second exhaust rotary valve bearing 186 (via the second exhaust rotary seal 188).

Analysis and simulations were performed to evaluate the operational characteristics and potential performance attributes associated with configurations similar to the independent rotary valve engine 100, particularly in comparison to conventional poppet valve engine designs. Thermodynamic simulations, utilizing software tools such as LOTUS® Engine software, were employed to investigate the influence of the intake valve closing (IVC) angle on various engine performance parameters. These parameters included volumetric efficiency, brake power, and brake torque, evaluated across a range of engine speeds and different intake valve closing angles. For comparative analysis, a baseline conventional poppet valve engine configuration, such as for a 70 cc engine, was modeled, followed by modeling of a configuration representative of the independent rotary valve engine 100 applied to the same base engine size.

The analysis and simulations performed indicate potential performance advantages for the independent rotary valve engine 100 compared to conventional poppet valve configurations. By utilizing the engine control device to dynamically adjust the intake valve closing angle via the bidirectional servo motor 108 and the inner intake rotary valve shaft 150, simulations suggest improvements in volumetric efficiency across a wider range of engine speeds. This capability for variable valve timing, combined with the potential reduction in pumping losses achieved by controlling intake flow directly at the intake rotary valve port 142 (as supported by both analytical calculations based on fluid dynamics principles and computational fluid dynamics simulations showing lower pressure drops), suggests potential gains in brake power, brake torque, and overall thermal efficiency for the independent rotary valve engine 100 relative to engines relying on fixed valve timing and conventional upstream throttling methods.

The independent rotary valve engine 100 of the present disclosure integrates a specific arrangement of components including the intake rotary valve 120 located within the first channel 122 and the exhaust rotary valve 128 located within the parallel second channel 126 in the cylinder head 112. The intake rotary valve 120 incorporates the inner intake rotary valve shaft 150 connected via the pulley 130 to the bidirectional servo motor 108, and the outer sleeve 152 surrounding the inner intake rotary valve shaft 150. This arrangement provides for independent rotational control of the inner intake rotary valve shaft 150 by the bidirectional servo motor 108 based on variable valve timing signals generated by the engine control device, while the outer sleeve 152 and the exhaust rotary valve 128 are rotated simultaneously based on rotation of the crankshaft 104 via the sprocket and chain mechanism 160. This combination of synchronized mechanical rotation and independent servo-motor actuation facilitates control over the intake process directly at the intake rotary valve port 142.

Compared to engine configurations utilizing fixed valve timing determined solely by mechanical linkages like camshafts, or those relying primarily on throttling via a separate valve upstream in the intake tract, the independent rotary valve engine 100 offers distinct operational characteristics. The capability of the engine control device to determine the intake valve closing angle based on the engine speed requirement and generate the variable valve timing signals allows the bidirectional servo motor 108 to dynamically adjust the position of the inner intake rotary valve shaft 150. This adjustment directly influences the effective opening of the intake rotary valve port 142, providing both a throttling function at the port and variable control over the intake valve closing timing. This method of controlling intake flow may lead to a reduction in pumping losses associated with overcoming restrictions in upstream throttle bodies, and the variable intake valve closing timing may provide for optimization of volumetric efficiency across a broader range of operating speeds and loads.

Furthermore, the design of the independent rotary valve engine 100, employing rotary valves 120, 128 driven in part by the sprocket and chain mechanism 160 and the bidirectional servo motor 108 potentially simplifies the valvetrain structure compared to systems using poppet valves, springs, rockers, and complex camshafts. This structural difference may contribute to reduced mechanical friction and inertia within the valvetrain. The integrated control strategy, in which the engine control device coordinates spark timing signals for the spark plug 132 with the variable valve timing signals for the bidirectional servo motor 108 based on inputs like the engine speed requirement, provides for management of the combustion process in conjunction with the variable gas exchange characteristics. These combined attributes leads to improvements in engine performance metrics such as brake power, brake torque, and overall fuel efficiency relative to certain conventional engine designs.

Figure 9:
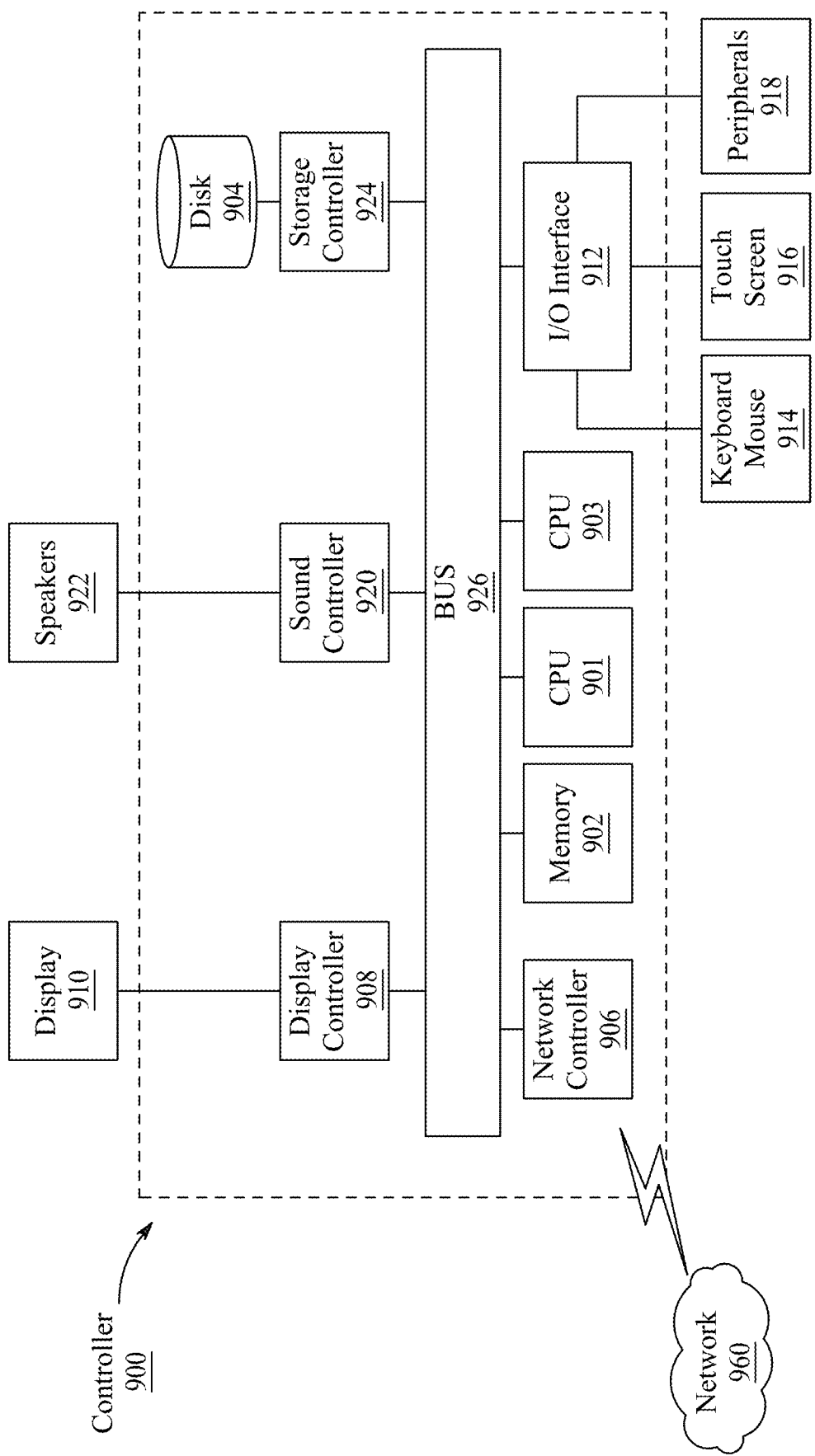
FIG. 9 is an illustration of a non-limiting example of details of computing hardware used in the computing system, according to certain embodiments.

Next, further details of the hardware description of a computing environment according to exemplary embodiments is described with reference to FIG. 9. In FIG. 9, a controller 900 is described is representative of the engine control unit of the present independent rotary valve engine 100 to control operations of various electrical components therein, in which the controller 900 is a computing device which includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, Microsoft Windows 8, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN sub-networks. The network 960 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 908, such as a NVIDIA Geforce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
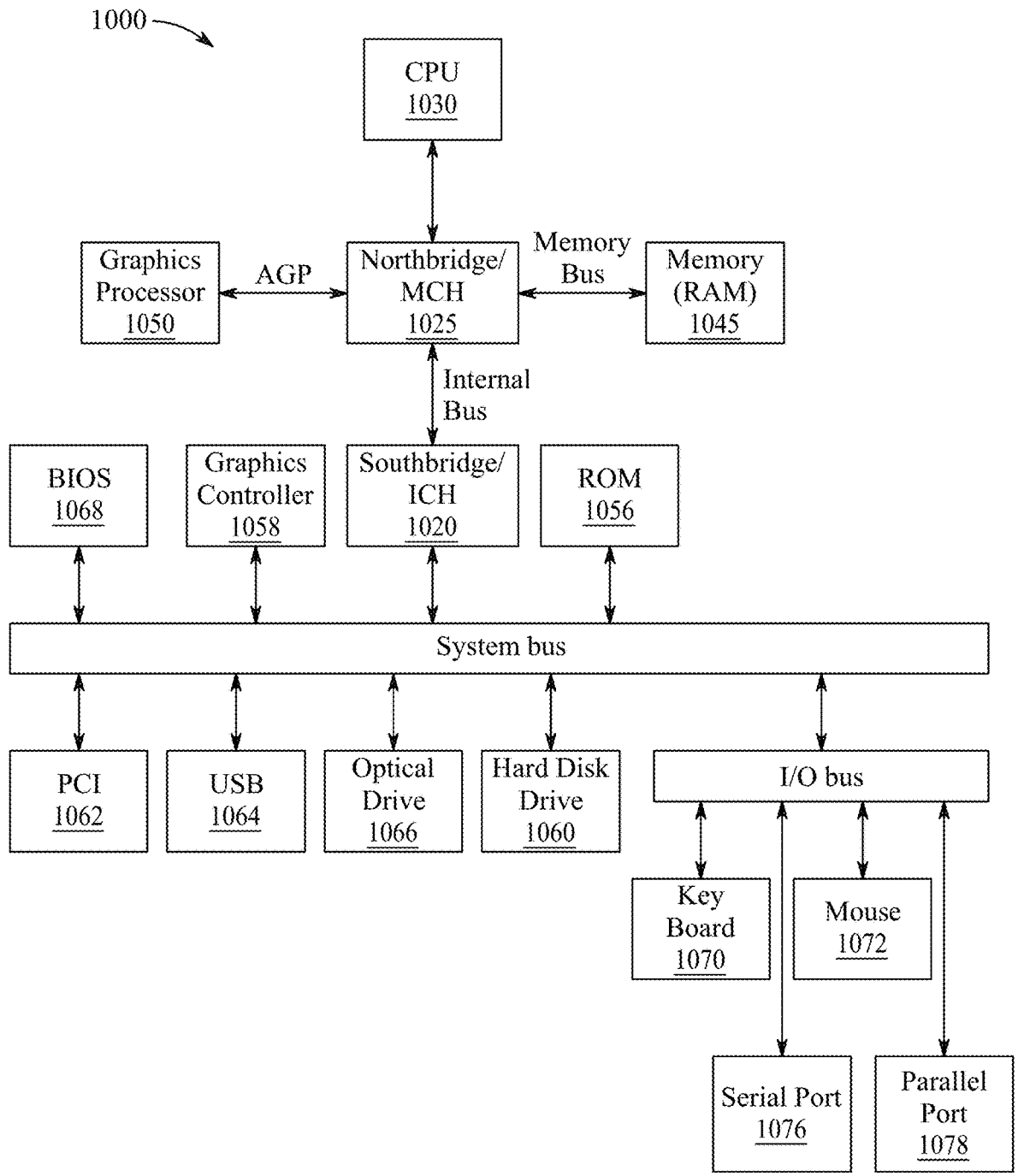
FIG. 10 is an exemplary schematic diagram of a data processing system used within the computing system, according to certain embodiments.

FIG. 10 shows a schematic diagram of a data processing system, according to certain embodiments, for performing the functions of the exemplary embodiments. The data processing system is an example of a computer in which code or instructions implementing the processes of the illustrative embodiments may be located.

In FIG. 10, data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
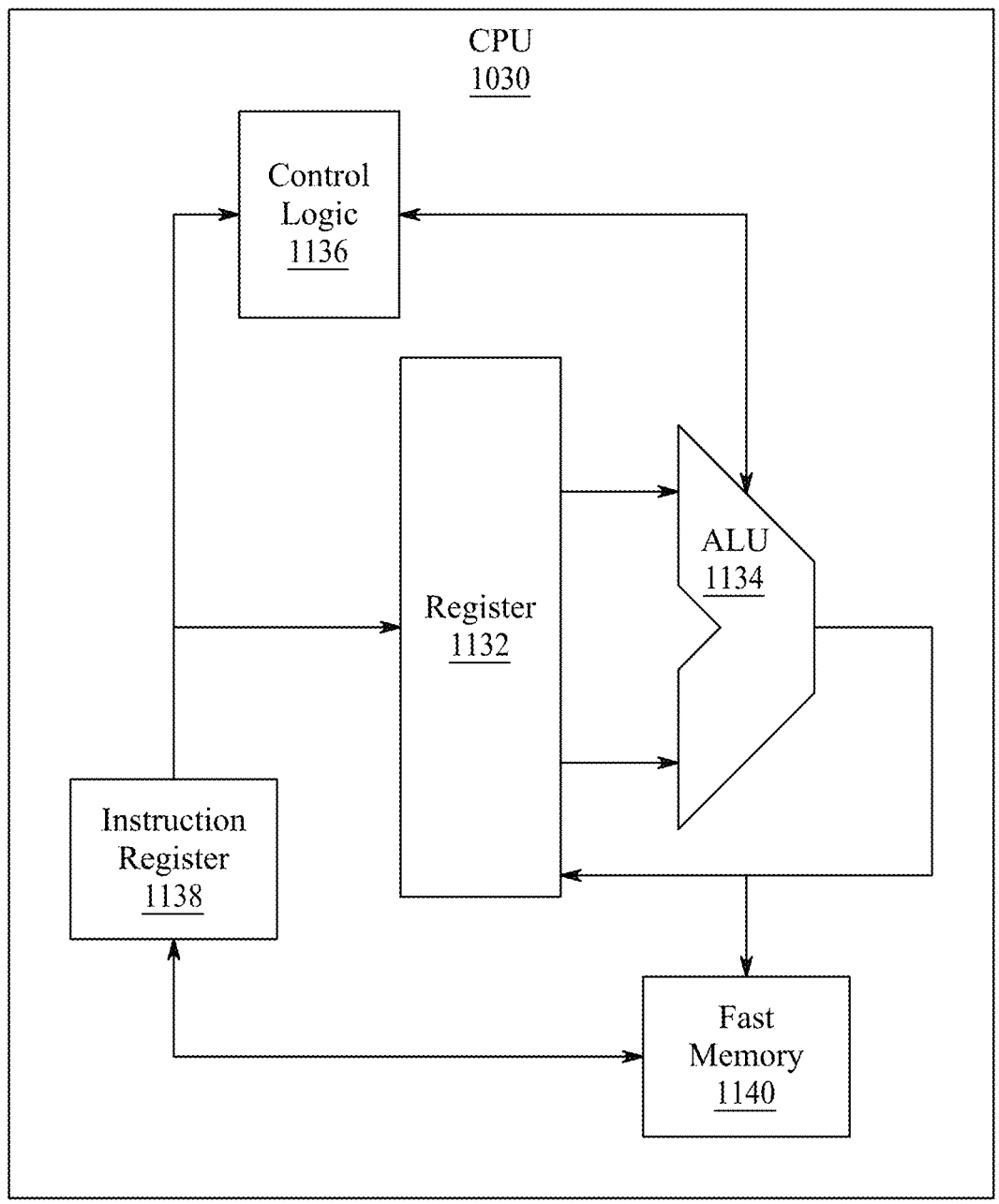
FIG. 11 is an exemplary schematic diagram of a processor used with the computing system, according to certain embodiments.

For example, FIG. 11 shows one implementation of CPU 1030. In one implementation, the instruction register 1138 retrieves instructions from the fast memory 1140. At least part of these instructions are fetched from the instruction register 1138 by the control logic 1136 and interpreted according to the instruction set architecture of the CPU 1030. Part of the instructions can also be directed to the register 1132. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1030 can use a reduced instruction set architecture, a complex instruction set architecture, a vector processor architecture, a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1000 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1088 through a PCI bus 1062.

The PCI devices may include, for example, Ethernet adapters, add-in cards, and PC cards for notebook computers. The Hard disk drive 1060 and CD-ROM 1066 can use, for example, an integrated drive electronics (IDE) or serial advanced technology attachment (SATA) interface. In one implementation the I/O bus can include a super I/O (SIO) device.

Further, the hard disk drive (HDD) 1060 and optical drive 1066 can also be coupled to the SB/ICH 1020 through a system bus. In one implementation, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 12:
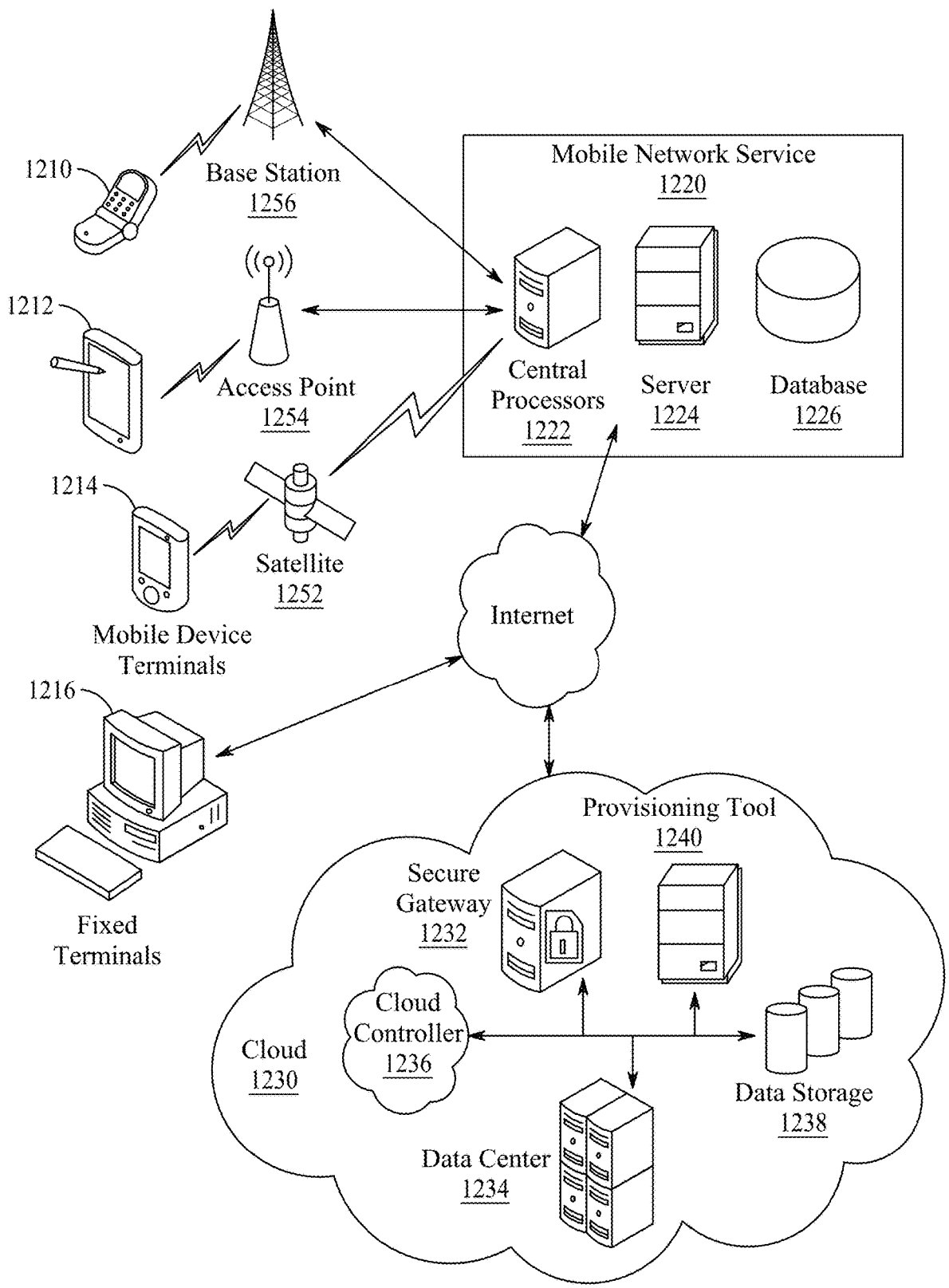
FIG. 12 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1230 including a cloud controller 1236, a secure gateway 1232, a data center 1234, data storage 1238 and a provisioning tool 1240, and mobile network services 1220 including central processors 1222, a server 1224 and a database 1226, which may share processing, as shown by FIG. 12, in addition to various human interface and communication devices (e.g., display monitors 1216, smart phones 1210, tablets 1212, personal digital assistants (PDAs) 1214). The network may be a private network, such as a LAN, satellite 1252 or WAN 1254, or be a public network, may such as the Internet. Input to the system may be received via direct user input and received remotely either in real-time or as a batch process. Additionally, some implementations may be performed on modules or hardware not identical to those described. Accordingly, other implementations are within the scope that may be claimed.

While specific embodiments of the invention have been described, it should be understood that various modifications and alternatives may be implemented without departing from the spirit and scope of the invention. For example, different cellular automata rules or encryption algorithms could be employed, or alternative feature extraction and face recognition techniques could be integrated into the system.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A fuel injected independent rotary valve engine, comprising:
   an engine crankcase;
   a crankshaft located in a bore in the engine crankcase;
   a bidirectional servo motor connected to the engine crankcase;
   a cylinder block connected to the engine crankcase;
   a cylinder head connected to the cylinder block;
   a piston located within a combustion chamber of the cylinder block;
   a connecting rod attached between the piston and the crankshaft;
   a fuel injector;
   an intake rotary valve located within a first channel in the cylinder head, wherein the fuel injector is in fluid communication with the intake rotary valve;
   an exhaust rotary valve located within a second channel in the cylinder head, wherein the second channel is parallel to the first channel;
   a pulley connected to a servo motor shaft of the bidirectional servo motor and a first end of the intake rotary valve;
   a spark plug operatively connected within the cylinder head; and
   an engine control unit operatively connected to the spark plug and the servo motor, wherein the engine control unit is configured to:
   generate spark timing signals configured to actuate the spark plug to combust a fuel mixture in the combustion chamber,
   receive an engine speed requirement,
   determine a wide-open throttle position and an intake valve closing angle based on the engine speed requirement, and
   generate variable valve timing signals configured to rotate the servo motor shaft in one of a clockwise direction and a counterclockwise direction based on the wide-open throttle position and the intake valve closing angle.

2. The independent rotary valve engine of claim 1, further comprising:
   an intake manifold connected to a second end of the intake rotary valve, wherein the fuel injector and the intake manifold are configured to inject the fuel mixture into the second end of the intake rotary valve; and
   an intake rotary valve port located on the intake rotary valve between the first end of the intake rotary valve and the intake manifold, wherein the intake rotary valve port is configured to release the fuel mixture into the combustion chamber.

3. The independent rotary valve engine of claim 2, wherein the intake rotary valve port has an elliptical shape, wherein a minor axis of the intake rotary valve port is about 25% of a circumference of the intake rotary valve and a major axis of the intake rotary valve port is about 50% of the circumference of the intake rotary valve.

4. The independent rotary valve engine of claim 2, further comprising:
   a sealing cap located on a first end of the exhaust rotary valve;
   an exhaust manifold connected to a second end of the exhaust rotary valve; and
   an exhaust rotary valve port located on the exhaust rotary valve between the sealed first end and the second end, wherein the exhaust rotary valve port is configured to receive an exhaust gas from the combustion chamber and release the exhaust gas into the exhaust manifold.

5. The independent rotary valve engine of claim 4, wherein the exhaust rotary valve port has an elliptical shape, wherein a minor axis of the intake rotary valve port is about 25% of a circumference of the exhaust rotary valve and a major axis of the exhaust rotary valve port is about 50% of the circumference of the exhaust rotary valve.

6. The independent rotary valve engine of claim 4, wherein the intake rotary valve comprises:
   an inner intake rotary valve shaft which includes the first end of the intake rotary valve, wherein the first end is connected to the pulley; and
   an outer sleeve configured to surround the inner intake rotary valve shaft.

7. The independent rotary valve engine of claim 6, further comprising:
   a sprocket and chain mechanism connected to the outer sleeve of the intake rotary valve, to the exhaust rotary valve and to the crankshaft, wherein the sprocket and chain mechanism is configured to rotate the outer sleeve of the intake rotary valve and the exhaust rotary valve simultaneously based on the rotation of the crankshaft.

8. The independent rotary valve engine of claim 7, further comprising:
   a first inner intake rotary valve shaft bearing located between the pulley and the first end of the inner intake rotary valve shaft;
   a first outer sleeve bearing located near the first inner intake rotary valve shaft bearing, wherein the first outer sleeve bearing is configured to rotatably connect the first inner intake rotary valve shaft to the outer sleeve;
   a first intake rotary valve seal located between the first inner intake rotary valve shaft bearing and the first outer sleeve bearing, wherein the first intake rotary valve seal is configured to prevent loss of the fuel mixture from the first end of the intake rotary valve; and
   a second intake rotary valve seal located between the first outer sleeve bearing and the intake rotary valve port, wherein the second intake rotary valve seal is configured to prevent loss of the fuel mixture between the inner intake rotary valve port and the outer sleeve.

9. The independent rotary valve engine of claim 8, further comprising:
   a second inner intake rotary valve shaft bearing located on the second end, wherein the second inner rotary valve shaft bearing is configured to rotatably connect the second end of the inner intake rotary valve shaft to a connection pipe of the intake manifold;
   a second outer sleeve bearing located between the intake rotary valve port and the second inner intake rotary valve shaft bearing;
   a third intake rotary valve seal located between the second inner intake rotary valve shaft bearing and the second outer sleeve bearing, wherein the third intake rotary valve seal is configured to prevent loss of the fuel mixture between the second end of inner intake rotary valve shaft and the outer sleeve; and
   a fourth intake rotary valve seal located adjacent to the second outer sleeve bearing, wherein the fourth intake rotary valve seal is configured to prevent loss of the fuel mixture from the intake rotary valve port to the outer sleeve.

10. The independent rotary valve engine of claim 7, further comprising:
a first exhaust rotary valve bearing located adjacent the sealing cap of the exhaust rotary valve; and
a first exhaust rotary valve seal located on the exhaust rotary valve between the first exhaust rotary valve bearing and the exhaust rotary valve port, wherein the first exhaust rotary valve seal is configured to prevent backflow of the exhaust towards the first end.

11. The independent rotary valve engine of claim 10, further comprising:
a second exhaust rotary valve bearing located on the second end of the exhaust rotary valve, wherein the second exhaust rotary valve bearing is configured to rotatably connect the second end of the exhaust rotary valve to a connection pipe of the exhaust manifold; and
a second exhaust rotary seal located adjacent to the second exhaust rotary valve bearing between the second exhaust rotary valve bearing and the exhaust rotary valve port, wherein the second exhaust rotary seal is configured to prevent loss of the exhaust from the second exhaust rotary valve bearing.

12. The independent rotary valve engine of claim 7, wherein the bidirectional servo motor is configured to rotate the servo motor shaft to turn the pulley, wherein turning the pulley is configured to rotate the inner intake rotary valve to one of move the inner intake rotary valve port at least partially over the combustion chamber to expel an air/fuel mixture into the combustion chamber and to move the inner intake rotary valve port away from the combustion chamber to permit ignition of the air/fuel mixture by the spark plug.

13. The independent rotary valve engine of claim 12, wherein the engine control unit is configured to generate the intake valve timing signals to actuate the bidirectional servo motor to rotate the servo motor shaft to turn the pulley and rotate the inner intake rotary valve port to one of a fully open position, a partially open position, an idling position and a fully closed position based on the wide-open throttle position and the intake valve closing angle.

14. The independent rotary valve engine of claim 13, wherein the exhaust rotary valve port is configured to be in an open position over the combustion chamber when the inner intake rotary valve port is in the fully closed position.

* * * * *